United States Patent
Arakawa

[19]

[11] Patent Number: 5,845,076
[45] Date of Patent: Dec. 1, 1998

[54] DATA INPUT/OUTPUT APPARATUS COUPED TO A NETWORK FOR ACCEPTING DIRECT COMMANDS FROM A DATA SOURCE AFTER RECEIVING REQUEST THROUGH THE SERVER

[75] Inventor: Naoto Arakawa, Yokohama, Japan

[73] Assignee: Canon Kabushiki Kaisha, Tokyo, Japan

[21] Appl. No.: 582,180

[22] Filed: Jan. 2, 1996

[30] Foreign Application Priority Data

Jan. 6, 1995 [JP] Japan ................................. 7-016506
Dec. 19, 1995 [JP] Japan ................................. 7-330358

[51] Int. Cl.⁶ ................................................ G06F 13/00
[52] U.S. Cl. .................................... 395/200.33; 395/825
[58] Field of Search ........................ 395/200.33, 200.32, 395/200.47, 200.49, 200.51, 825, 826, 834, 851

[56] References Cited

U.S. PATENT DOCUMENTS 5,170,466  12/1992  Rogan et al. ............................ 395/792
5,220,674   6/1993  Morgan et al. ..................... 395/200.53
5,550,957   8/1996  Davidson ............................... 395/114
5,636,333   6/1997  Davidson ............................... 395/114
5,647,056   7/1997  Barrett et al. ...................... 395/200.5
5,651,114   7/1997  Davidson .......................... 395/200.59

FOREIGN PATENT DOCUMENTS 63-66501  3/1988  Japan .
4123006   4/1992  Japan .
5241012   9/1993  Japan .

*Primary Examiner*—Dinh C. Dung
*Attorney, Agent, or Firm*—Fitzpatrick, Cella, Harper & Scinto

[57] ABSTRACT

An apparatus in a system in which a data source, a server, and the apparatus are connected on a network includes a receiver for receiving a direct command from the data source for requesting direct communication between the data source and the apparatus. The apparatus also includes a judging unit for judging whether a direct command can be accepted when the direct command is received during a data communication with the server, and a controller for interrupting the data communication with the server when it is judged that the direct command can be accepted. The direct command allows a printing/scanning function of a data input/output apparatus connected to the apparatus to be executed without passing through the server.

24 Claims, 21 Drawing Sheets

FIG. 7

QUEUEING ENTRY TABLE 10200

| | |
|---|---|
| TABLE ID | 10207 |
| QUEUE TYPE | 10202 |
| ---------- | |
| TOTAL NO. OF QUEUES (N) | 10208 |
| QUEUEING TABLE FOR REGISTERED QUEUE ID:1 | 10209 |
| QUEUEING TABLE FOR REGISTERED QUEUE ID:2 | 10209 |
| ... | |
| QUEUEING TABLE FOR REGISTERED QUEUE ID:N | 10209 |

DIRECT CONNECTION PRINT

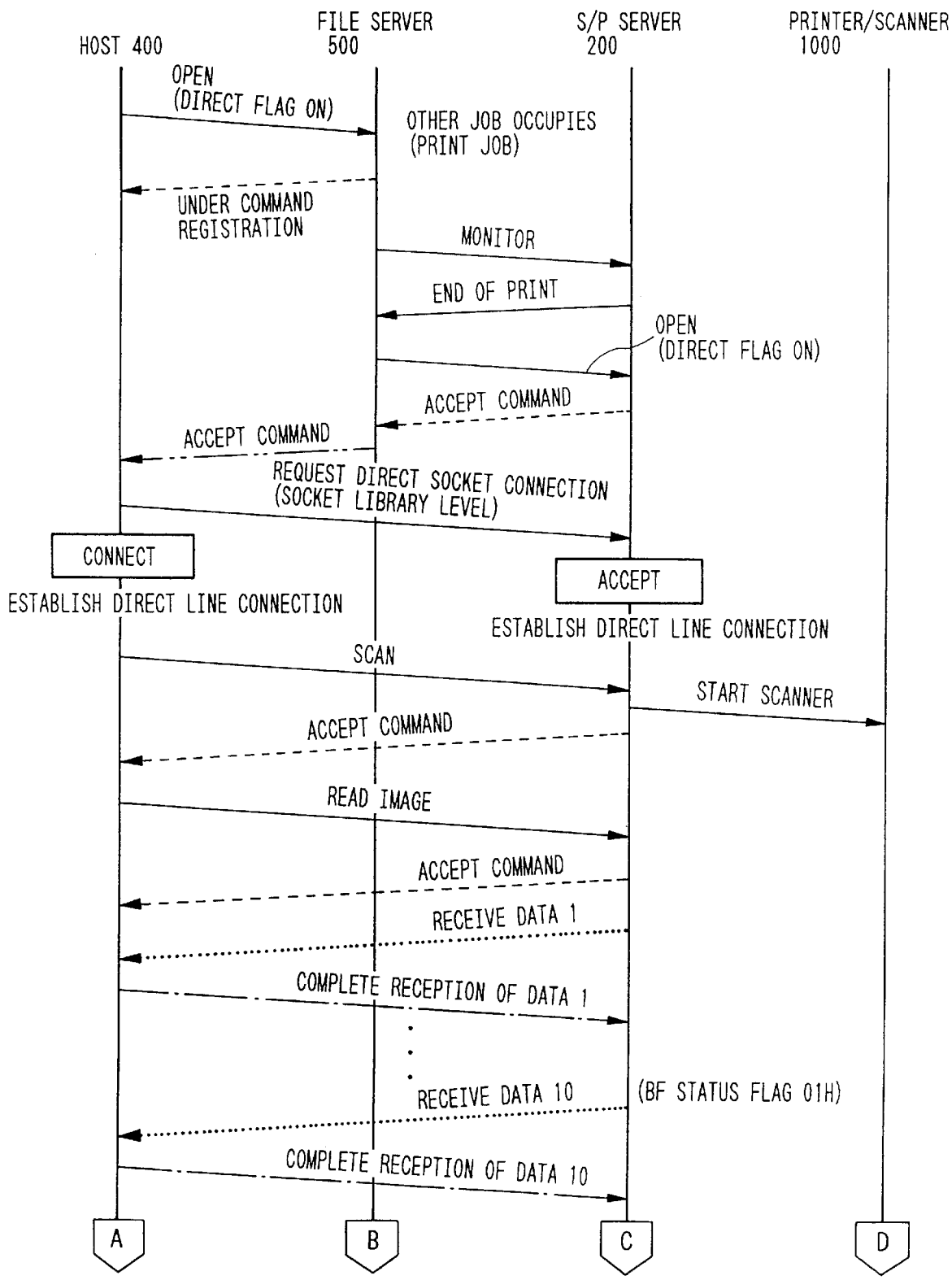

DATA INPUT/OUTPUT APPARATUS COUPED TO A NETWORK FOR ACCEPTING DIRECT COMMANDS FROM A DATA SOURCE AFTER RECEIVING REQUEST THROUGH THE SERVER

BACKGROUND OF THE INVENTION

1. Field of the Invention

The invention relates to a data input/output control apparatus in a network system which enables a plurality of client users to share a scanner function or a printer function on a network and also relates to a memory medium in which a program which is used in such an apparatus has been stored.

2. Related Background Art

In recent years, techniques for a sharing of data and a sharing of printer resources by connecting a plurality of computers onto a network have progressed. As a function in such techniques, attention is paid to a new function called a scanner server in which a plurality of users- share one scanner and which is different from a printer server.

SUMMARY OF THE INVENTION

It is an object of the invention to provide a data input/output control apparatus in a network system, in which different from a printer server, with respect to a scanner on a network, it is also possible to satisfy a requirement from a client user such that a functional viewpoint such as a scanner input which requires a real-time performance can be effectively utilized on the network and also to provide a memory medium in which a program which is used in such a data input/output control apparatus has been stored.

To solve the above problems, according to the invention, there is provided a data input/output control apparatus in a system in which a data source, a server, and a data input/output control apparatus are connected on a network, wherein the apparatus comprises: judging means for judging whether a direct command can be accepted from the data source during a data communication with the data source through the server or not; and control means for directly performing a data communication with the data source without passing through the server in the case where the judging means judges that the direct command can be accepted.

To solve the above problems, according to the invention, there is provided a memory medium in which a program that is used in a data input/output control apparatus in a system in which a data source, a server, and a data input/output control apparatus are connected on a network has been stored, wherein a judgment is made to see if a direct command can be accepted from the data source during a data communication with the data source through the server, and a program for directly performing a data communication with the data source without passing through the server when it is judged that the direct command can be accepted in the judging process is stored.

BRIEF DESCRIPTION OF THE DRAWINGS

FIG. 7 is a constructional diagram of a queueing entry table of the embodiment;

FIGS. 19A and 19B are schematic flowcharts for a direct connection scan of the embodiment.

DETAILED DESCRIPTION OF THE PREFERRED EMBODIMENT

Figure 1:
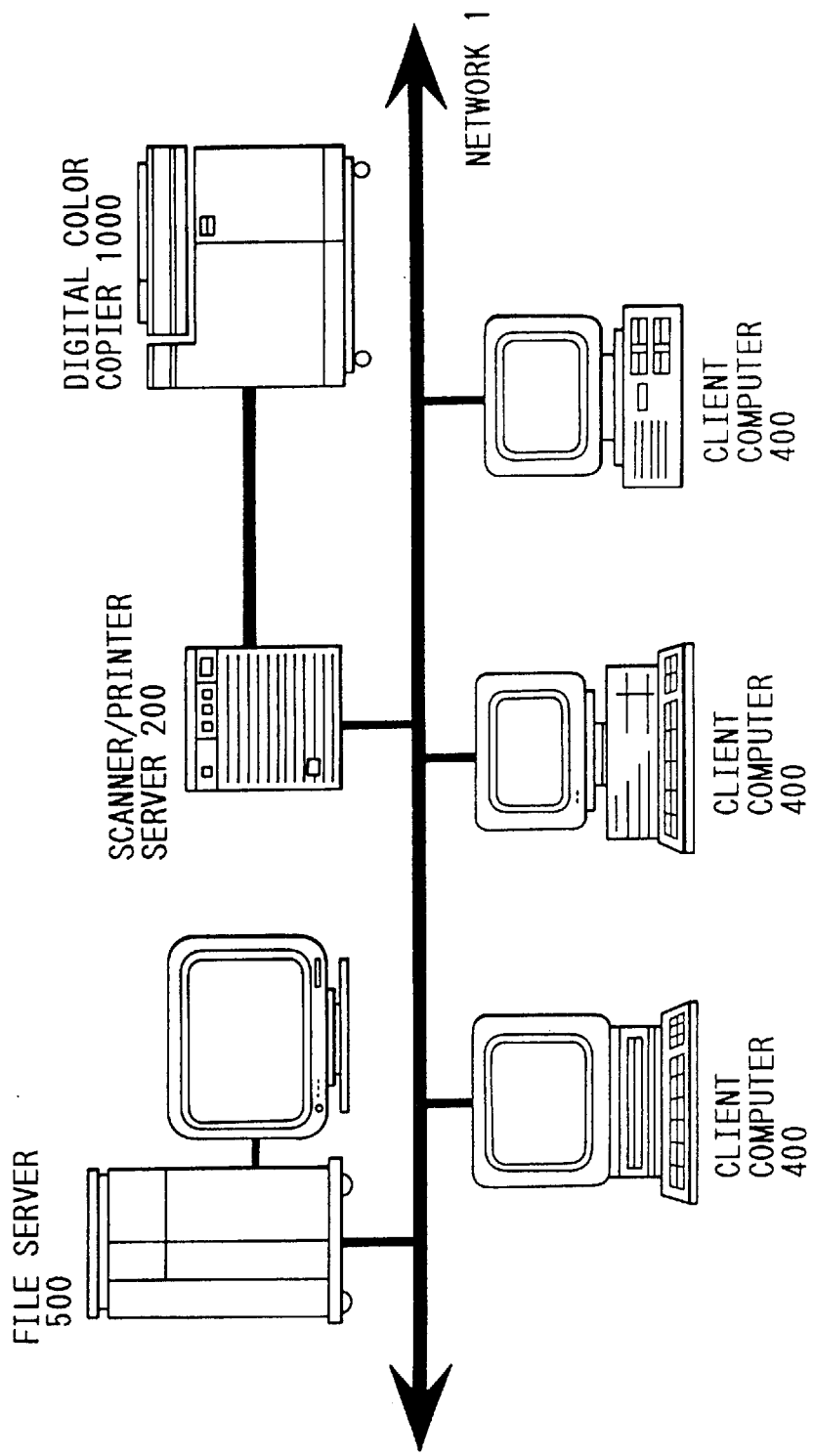
FIG. 1 is a constructional diagram of a network system of an embodiment.

An embodiment of the invention will now be described in detail hereinbelow with reference to the drawings. FIG. 1 is a constructional diagram of a scanner/printer server system of an embodiment of the invention. As shown in FIG. 1, the system of the embodiment is constructed by: a digital color copier (1000) comprising a digital color image reading unit [hereinafter, simply referred to as a color scanner] (100) arranged in the upper portion (refer to FIG. 2) and a digital color image printing unit [hereinafter, simply referred to as a color printer] (300) for printing and outputting a digital color image arranged in the lower portion (refer to FIG. 2); a scanner/printer (scanner/print) server (200) connected to a network (1); a file server (500) to support a file system on the network; and computers (400) of a plurality of client users.

Figure 2:
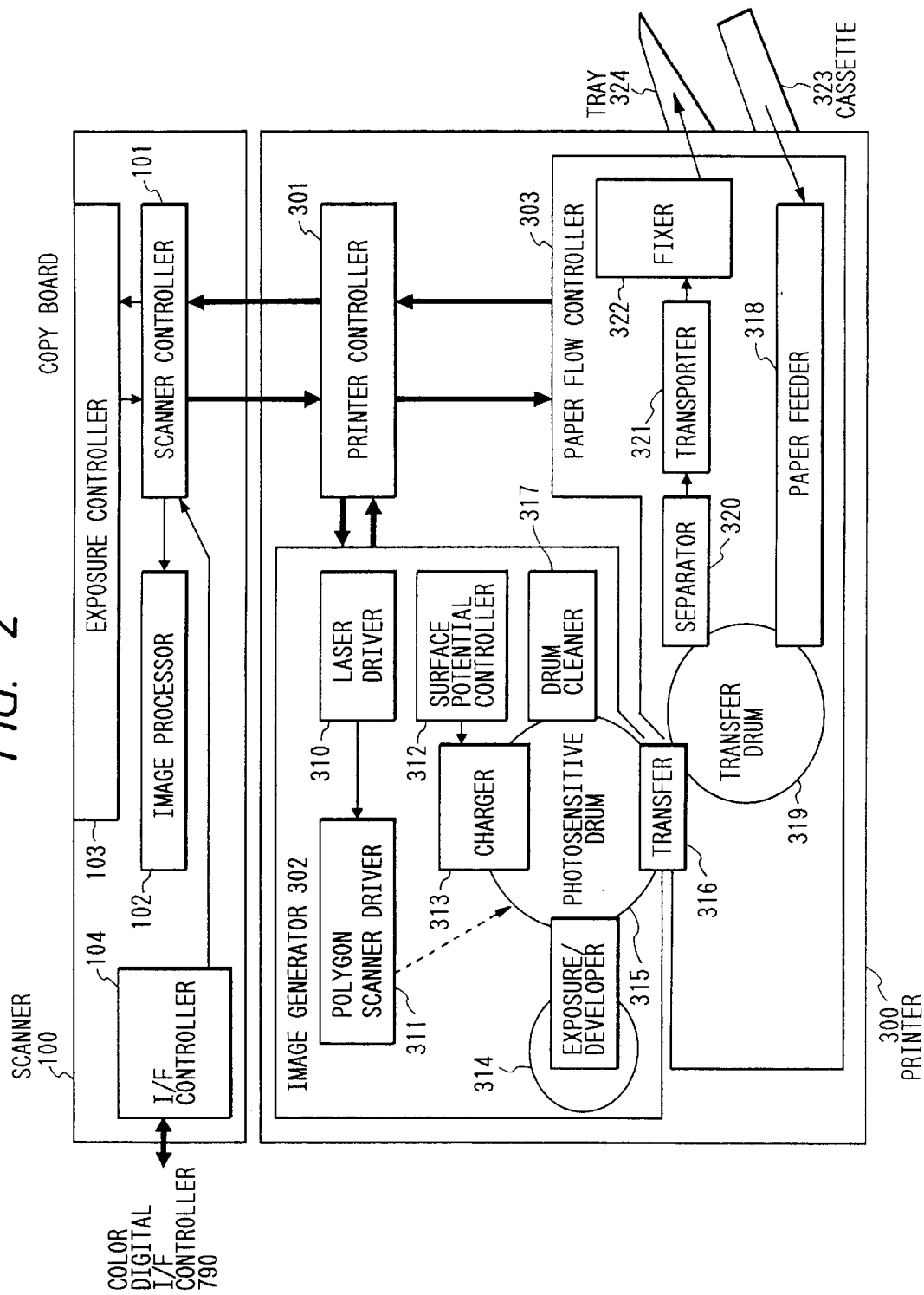
FIG. 2 is a constructional diagram of a digital color copier of the embodiment.

FIG. 2 shows a construction of the foregoing color digital copier (1000) having a scanner/printer function. In the scanner (100), a scanner controller (101) mainly performs the following controls. An exposure controller (103) color separates an original on a copyboard every color of R, G, and B by a contact type CCD line sensor and converts into dot-sequential analog image signals. Each of the analog image signals is converted to a digital image signal of eight bits of each color by an A/D converter. Thus, luminance signals of the colors of R, G, and B are generated as line-sequential signals. Those (digital) image signals are converted from the luminance levels of R, G, and B to the levels corresponding to toner amounts of four colors of C, M, Y, and Bk as densities by an image processor (102), respectively. At the same time, the signals are subjected to color correction arithmetic operations by the image processor (102) and various image processes such as synthesis, magnification change, movement, and the like are executed.

In the color printer (300) as a laser beam printer of the electrophotographic system, the digital image signal of each of C, M, Y, and Bk sent from the scanner (100) is converted to a turn-on signal of a semiconductor laser. A laser power is controlled by a laser driver (310). The turn-on signal of the laser is generated as a pulse width corresponding to the level of the digital image signal. A turn-on level of the laser lies within a range of 256 levels (corresponding to eight bits). In accordance with the digital image signals to be outputted, color images are limited every color of CMYK and are sequentially exposed and developed (314) onto a photosensitive drum (315) by a digital dot form and are transferred (316) onto a paper a plurality of number of times. The color images are finally fixed (322). The color scanner (100) and color printer (300) can also function as a digital color copier (1000) by controlling the color printer (300) by a control of the color scanner (100).

When the color scanner and color printer also function as a digital color copier (1000), the original image is set onto the copyboard of the color scanner (100). A copy start key is pressed. The image is read from the color scanner and processed and subjected to processes such as exposure, development, transfer, and fixing in the color printer (300) in accordance with the foregoing procedure, so that a color image is formed and outputted as a color copy.

Figure 3:
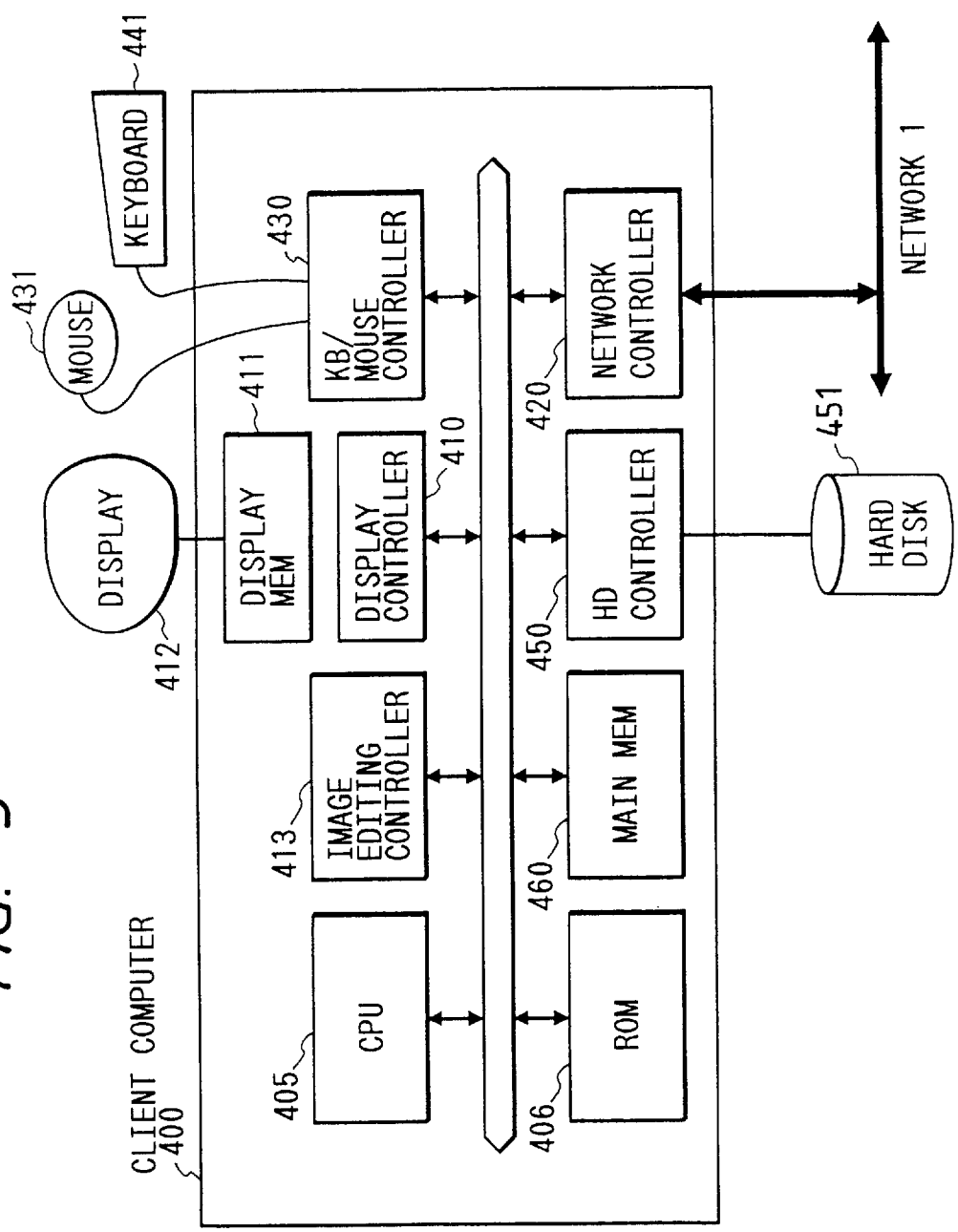
FIG. 3 is a constructional diagram of a client computer of the embodiment.

FIG. 3 shows a structure of the client computer (400) on the network. The client computer (400) is constructed by: a network controller (420) to control a protocol on the network with the scanner/printer server (200) and file server (500); a CPU (405) for a central control of the client computer; a hard disk (451) for temporarily registering image data and for storing various data; a hard disk (HD) controller (450) to control the hard disk; a main memory (460) a mouse (431) and a keyboard (441) serving as instruction input means from the operator; a color display (412) for performing a layout, an edition, and a menu display; a display memory (411); a display controller (410); and an image editing controller (413) for performing an image layout and an edition on the display memory (411).

Figure 4:
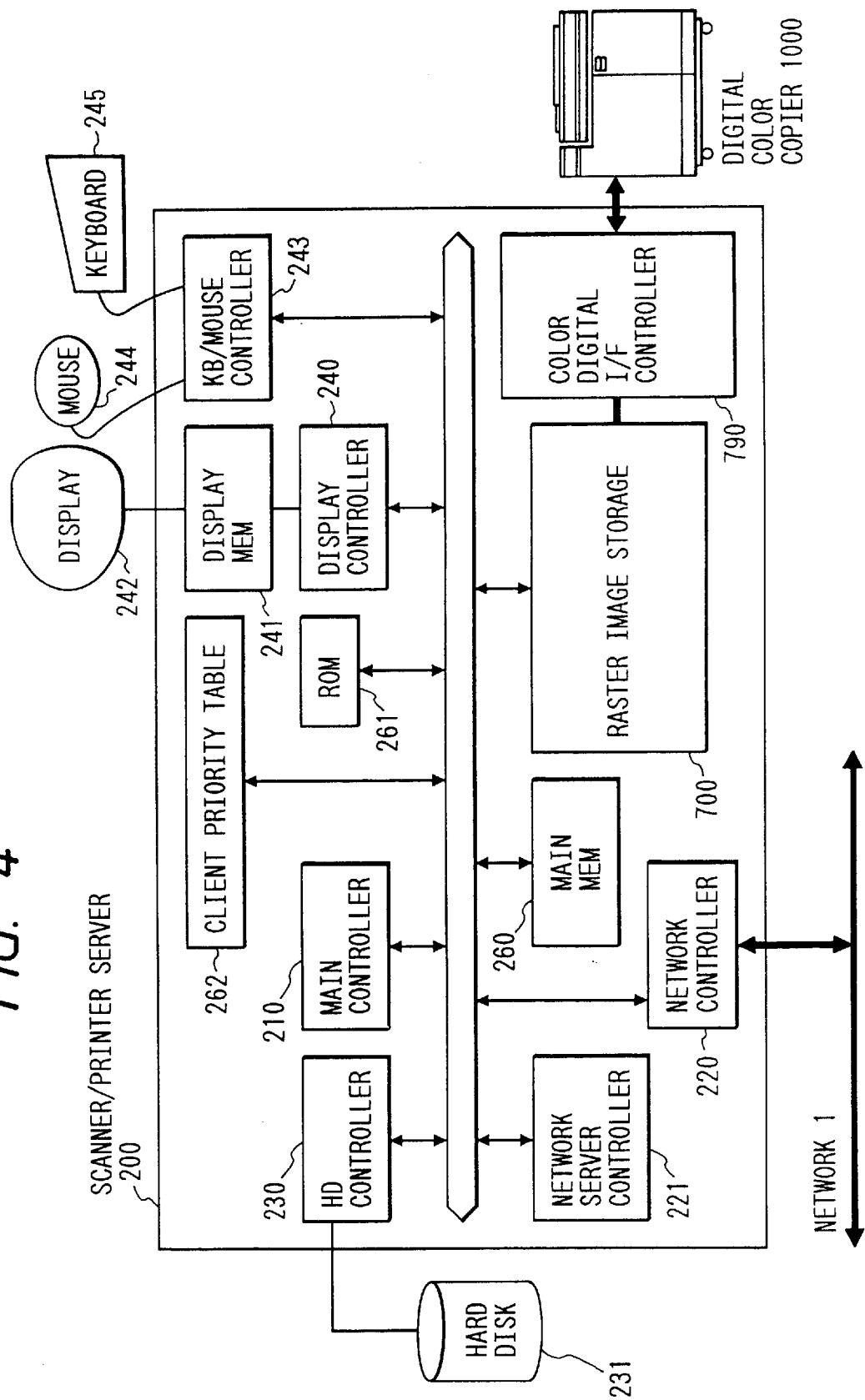
FIG. 4 is a constructional diagram of a scanner/printer server of the embodiment.

FIG. 4 shows the scanner/printer server (200) according to the invention. The apparatus is mainly constructed by: a main controller (210) to control the whole scanner/printer server (200); a network controller (220) to control a protocol process on the network; a network server controller (221) to perform a control as a server such as analysis of the contents of a packet extracted by the protocol, separation of the image data, and the like; and a raster image storage (700) for storing and managing color multivalue raster image data and its position and attribute information on the basis of the separated image data and command data and for performing a layout or the like.

As interfaces, there are provided: a color digital interface (I/F) controller (790) for transmitting and receiving image data and commands to/from the digital color copier (1000); a mouse (244) and a keyboard (245) serving as instruction input means from a server manager; a color display (242) for performing a layout, an edition, and a menu display; a display memory (241); and a display controller (240).

Figure 5:
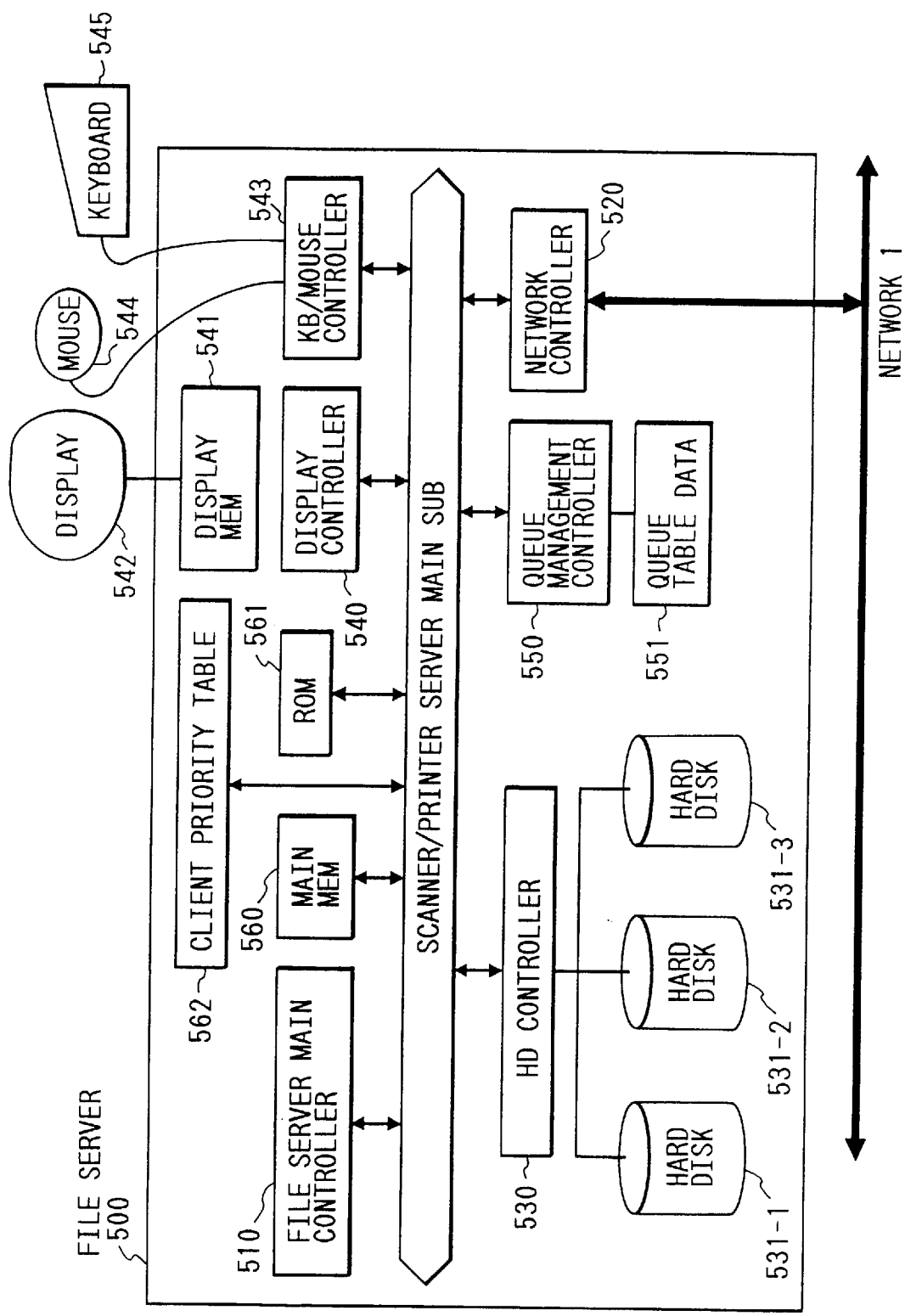
FIG. 5 is a constructional diagram of a file server of the embodiment.

FIG. 5 shows the file server (500) according to the invention. The file server is mainly constructed by: a network controller (520) to control a protocol process on the network; a file server main controller (510) to perform a control of the whole file server (500) such as analysis of the contents of a packet extracted by the protocol, separation of the image data, and the like; a hard disk controller (530) to control one or a plurality of hard disks; hard disks (531: 531-1, 531-2 and 531-3) connected to the hard disk controller; a queue management controller (550) to manage/control queueing file data registered on the hard disks; queue table data (551) regarding the management information; a mouse (544) and a keyboard (545) serving as instruction input means from a file server manager; a color display (542) to display a menu; a display memory (541); and a display controller (540).

Figure 6:
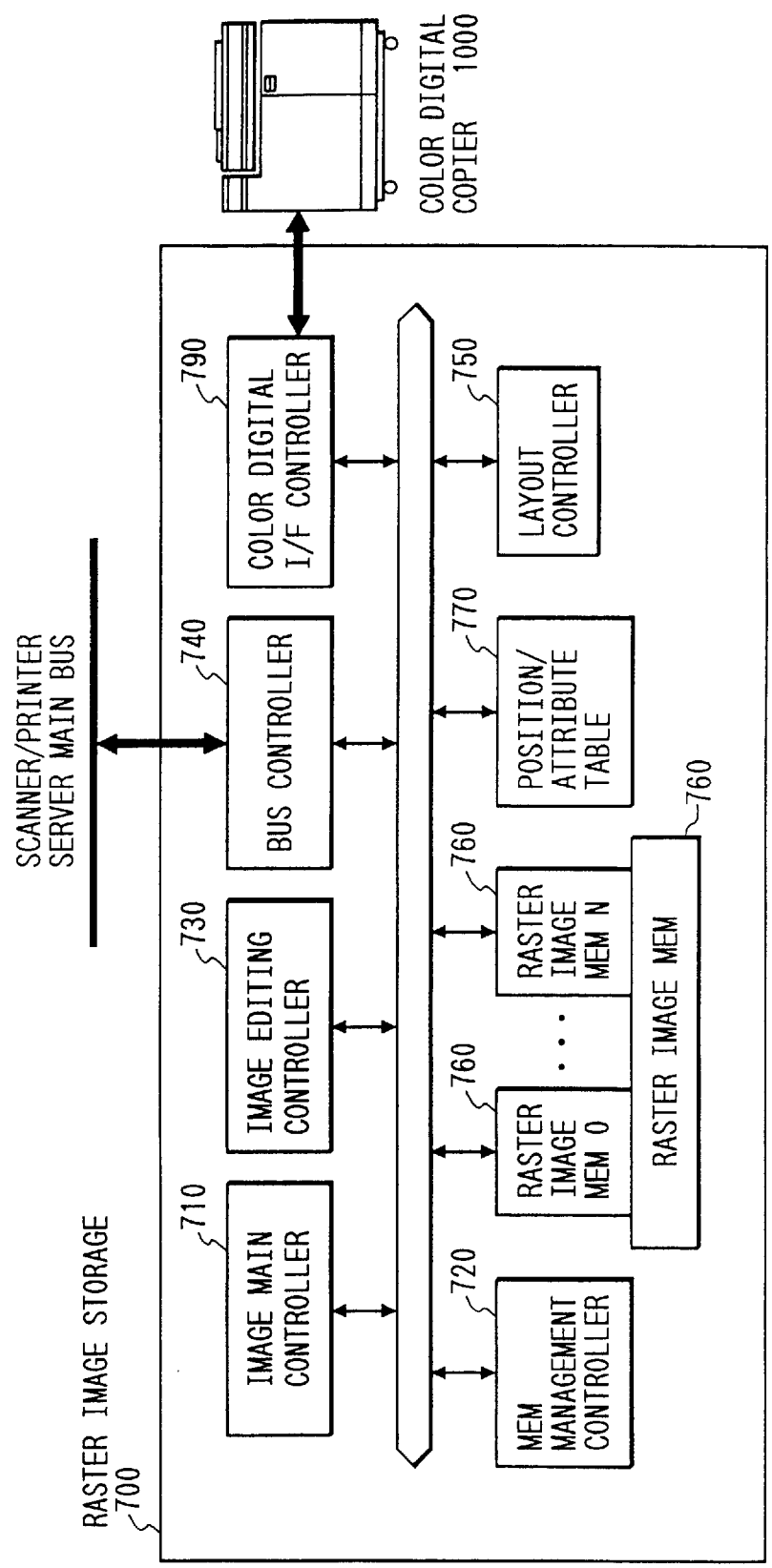
FIG. 6 is a constructional diagram of a raster image storage of the embodiment.

FIG. 6 is a constructional diagram of the raster image storage (700) in the scanner/printer server (FIG. 4). The raster image storage (700) is constructed by: mainly, an image main controller (710) to control whole raster image data; a memory management controller (720) for efficiently arranging and managing the color raster image data into a raster image memory (760); a position/attribute table (770); an image editing controller (730) to perform an image conversion regarding the color and an enlargement, a reduction, and a modifying edition with respect to the image data which has already been registered or when an image is registered onto the memory from the scanner; and a layout controller (750) to perform a layout edition in a real-time manner when the image data is outputted to the printer.

When the image data on the memory is outputted, the image data is transferred to the color printer (300) through the color digital interface controller (790), so that a color print image can be obtained. It is also possible to input the image data from the color scanner (100) and to register the image data onto the memory through the color digital I/F controller (790).

The image data and commands between the raster image storage (700) and a main bus of the scanner/printer server (200) are based on a specific format and are transmitted and received to/from the image main controller (710) and the main controller of the scanner/printer server (200) through a bus controller (740).

The raster image storage (700) can manage the image data in two modes of a file management mode and a page mode. In a printer output, the first file management mode is a function to store and manage a plurality of image data. As for the stored image data, a layout of each of the plurality of image data registered is performed by a command from the main controller (210) of the scanner/printer server. The image data after completion of the layout is outputted to the color printer (300) through the color digital I/F controller (790), thereby obtaining a color printer image. In this instance, a plurality of image data is divided into a plurality of image files and managed in the raster image memory (760). A start address on the memory, its image data length, an attribute of the image data, position information of a layout output of the image data, and the like are registered in the position/attribute table (770) and are managed by the memory management controller (720).

When the image data is actually outputted, the image data is set to the designated position and size by the image editing controller (730) for performing an image conversion regarding the color of the image data registered and the layout controller (750) to perform an enlargement, a reduction, a modifying edition at the time of a layout output. The resultant image data is outputted to the color printer (300) through the color digital I/F controller (790). Therefore, since the original image data always exists on the memory, the layout output can be changed and performed.

In the scanner input, according to the file management mode, a plurality of scanner input image data can be stored and managed in a manner similar to the print output. In this instance, the image data for a print output and the image data of the scanner input can be also allowed to mixedly exist. As for the image inputted from the scanner, the raster image memory (760) is divided into a plurality of file images and managed in a manner similar to the case of printing. A start address on the memory, its image data length, and an attribute of the image data are registered into the position/attribute table (770) and are managed by the memory management controller (720).

When the image data is actually inputted, the image data is set to the designated input size by the image editing controller (730) for performing an image conversion regarding the color of the scanner input image data inputted from the color scanner (100) and the layout controller (750) for performing an enlargement, a reduction, and a modifying edition upon inputting. The resultant image data is registered into the raster image memory.

In the page mode as another memory management mode, the raster image memory (760) is used as a sheet of paper. The memory is managed on the basis of a width (WIDTH) and a height (HEIGHT). When a layout of each of a plurality of image data is performed on the memory, the enlargement, reduction, and modification and the image conversion regarding the color of the image data are executed by the image editing controller (730). The resultant data is arranged at the designated layout position on the image memory.

As mentioned above, the image data is changed to the position and size designated by the layout controller (750) and is outputted to the color printer (300) through the color digital I/F controller (790) or the image data is registered into the image memory at the size designated from the color scanner (100).

Figure 9:
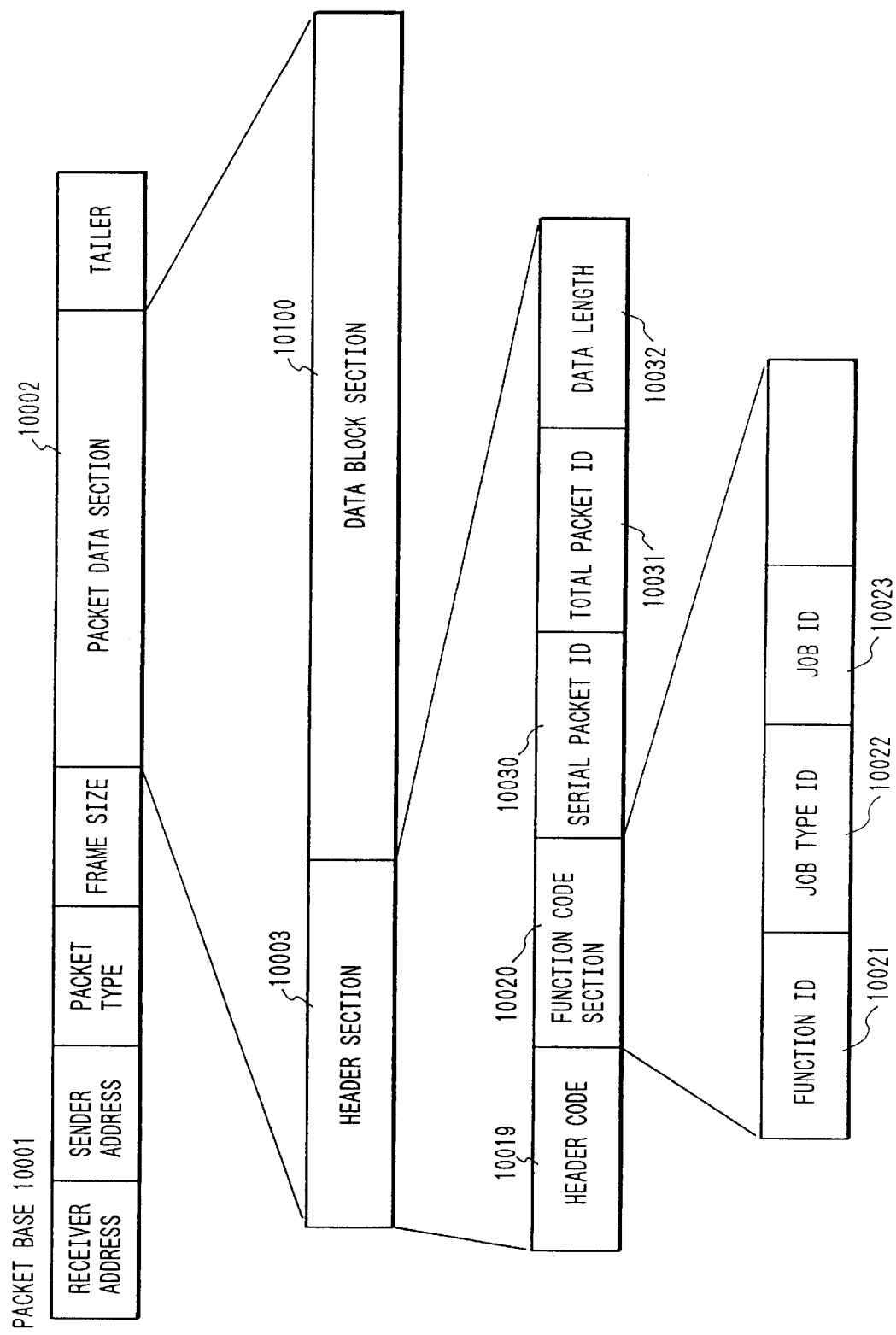
FIG. 9 is a constructional diagram of a whole/header section of a network packet of the embodiment.

On the network of the client computers (400), file server (500), and scanner/printer server (200), in order to individually communicate, one block of a group of data trains called a packet as shown in FIG. 9 is used and the packet is mutually transmitted and received. The packet has a structure such that a network address of a transmission destination is set to the head, a network address of a transmitting source is subsequently set, actual packet data is arranged after information of a frame size of the packet, and an error check code such as a CRC or the like called a tailer to improve the reliability of the data transfer is added to the last. With respect to a packet data section (10002), although arbitrary data can be inserted, in the embodiment, it is divided into a header section (10003) and a data block section (10100) as shown in FIGS. 9 and 10.

As shown in FIG. 9, the header section (10003) of the packet data section (10002) is constructed by: a header code indicative of header information that is first inserted to the head; a function code section (10020) indicating which function the packet data has; a serial packet ID (10030) showing a serial No. (number) in case of constructing one data by a plurality of packets; a total packet ID (10031) indicative of the total number of packets; and a data length (10032) indicative of a length of data of the data block section (10100) in which the actual data is inserted. A function code section (10020) is constructed by a function ID (10021) indicative of the type of scanner/printer server, a job type ID (10022) indicative of the type of job for the server, and a job ID (10023) to identify a job to be executed.

Figure 10:
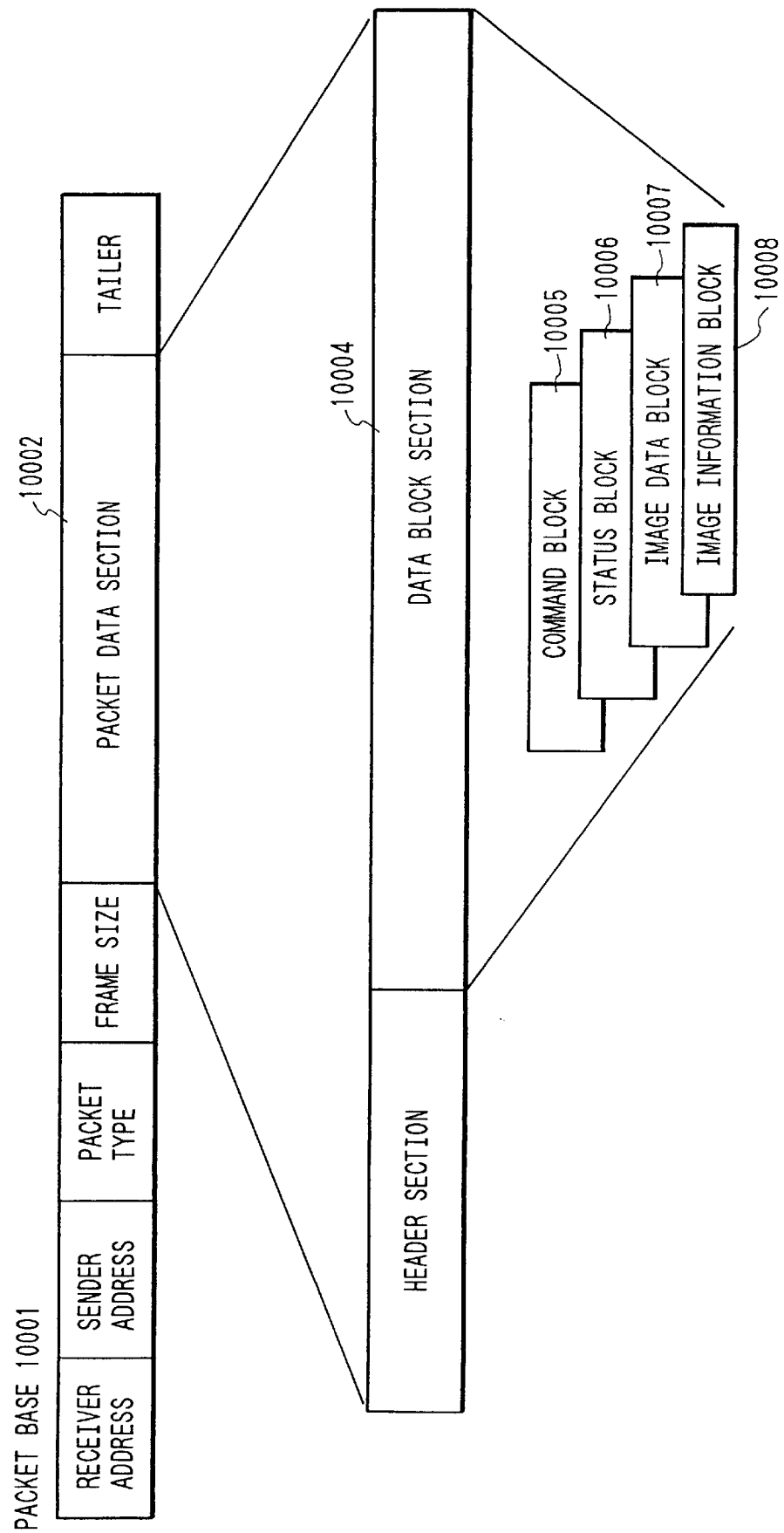
FIG. 10 is a constructional diagram of a data block section of the network packet of the embodiment.
Figure 11:
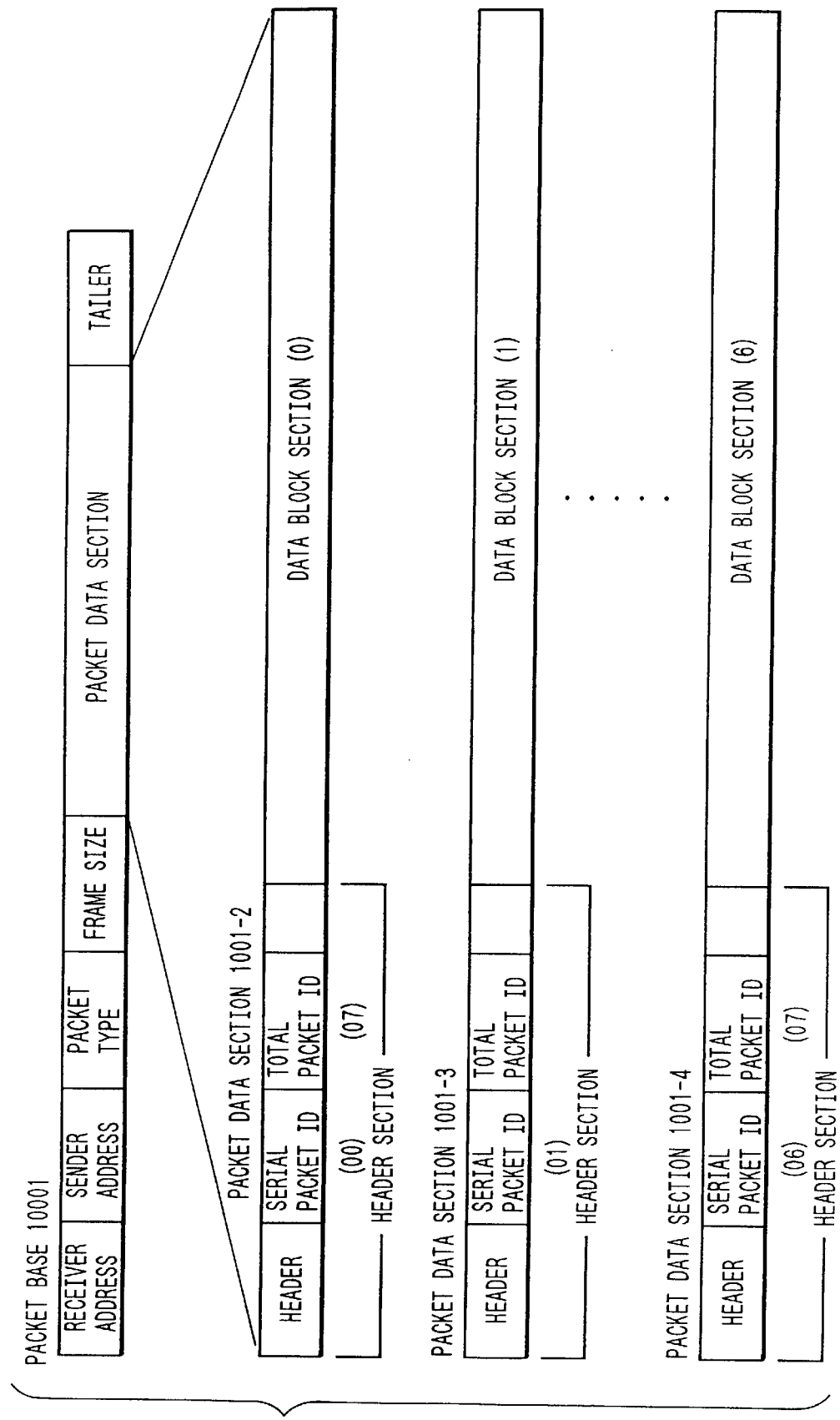
FIG. 11 is a constructional diagram of a continuous network packet of the embodiment.
Figure 12:
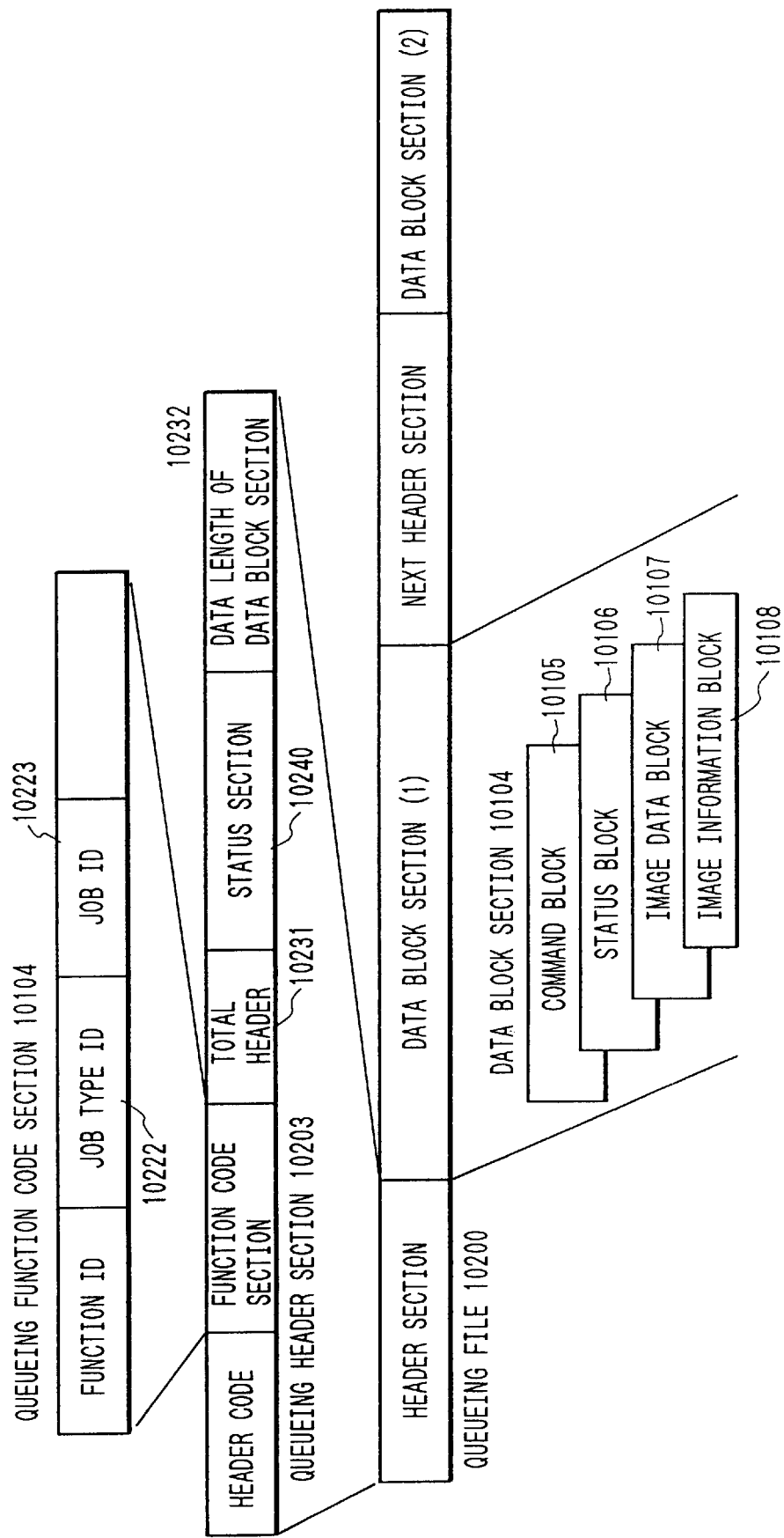
FIG. 12 is a constructional diagram of a queueing file of the embodiment.

As shown in FIG. 10, the data block section (10100) of the packet data section (10002) is divided into a command block (10005), a status block (10006), an image data block (10007), and image information block (10008) in accordance with the contents of the job type ID (10022) of the function code section of the header section. The operations of the direct connection print and the direct connection scan in a file server type mode of the invention in the scanner/printer server system with the above construction will now be schematically described hereinbelow with reference to FIGS. 18A, 18B, 19A, and 19B.

In the case where a direct-in type mode is set, the client computer (host) directly transmits and receives commands, data, etc. to/from the scanner/printer server (200) without passing through the file server (500), thereby allowing the printing operation and scanning operation to be executed in the digital color copier (1000).

Although either one of the file server type mode and the direct-in type mode is set on the client computer (host) side or the scanner/printer server side, it should be set by a specific user in order to set the mode on the network.

In the ordinary print in the file server type mode in the scanner/printer server system shown in FIG. 1, a command is registered in the file server (500), a command acceptance is received, and after that, the data is transmitted and received to/from the file server (500), and the S/P server (200) allows the data spooled in the file server (500) to be printed by the digital color copier (1000).

Figure 18A:
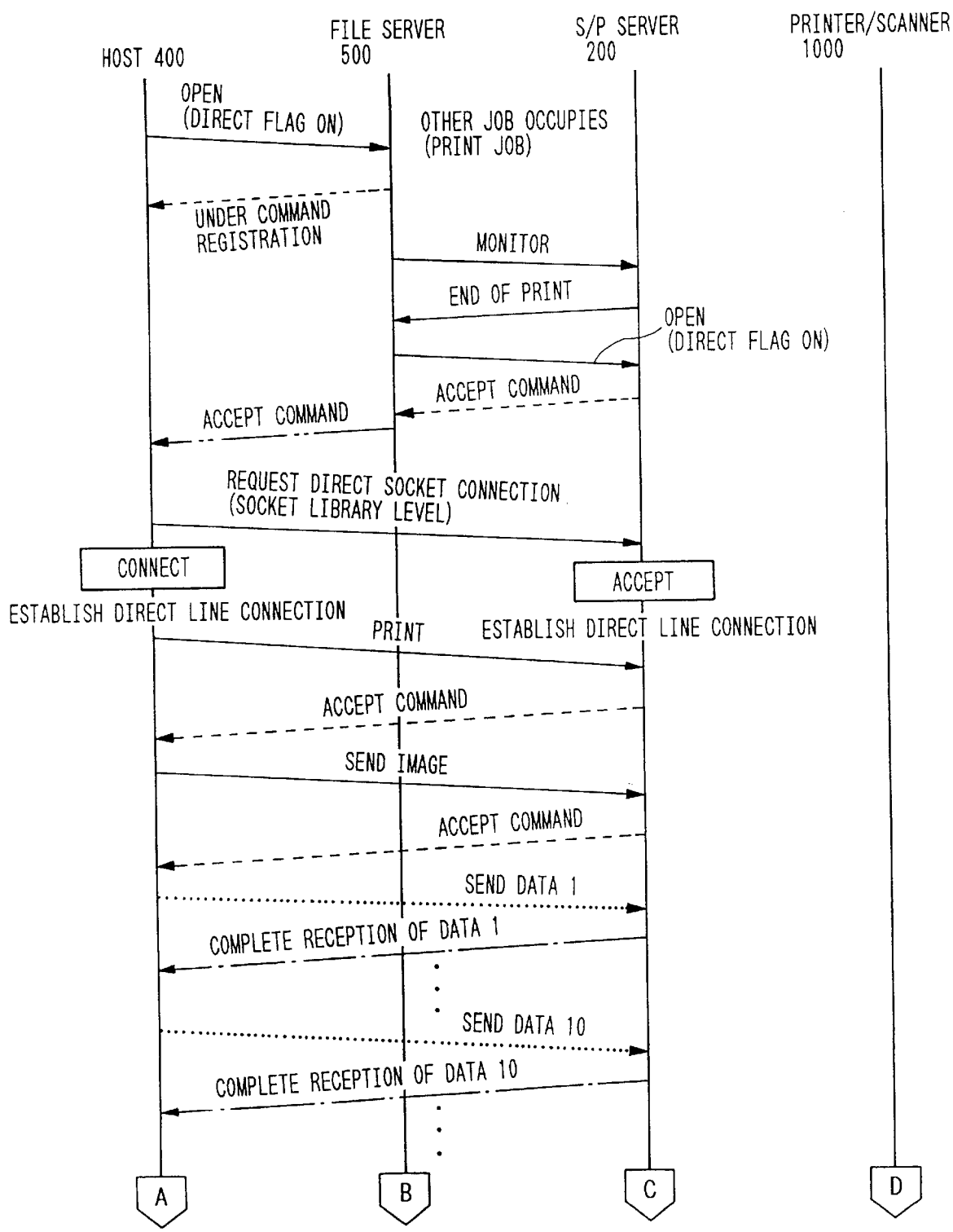
FIGS. 18A and 18B are schematic flowcharts for a direct connection print of the embodiment.
Figure 18B:
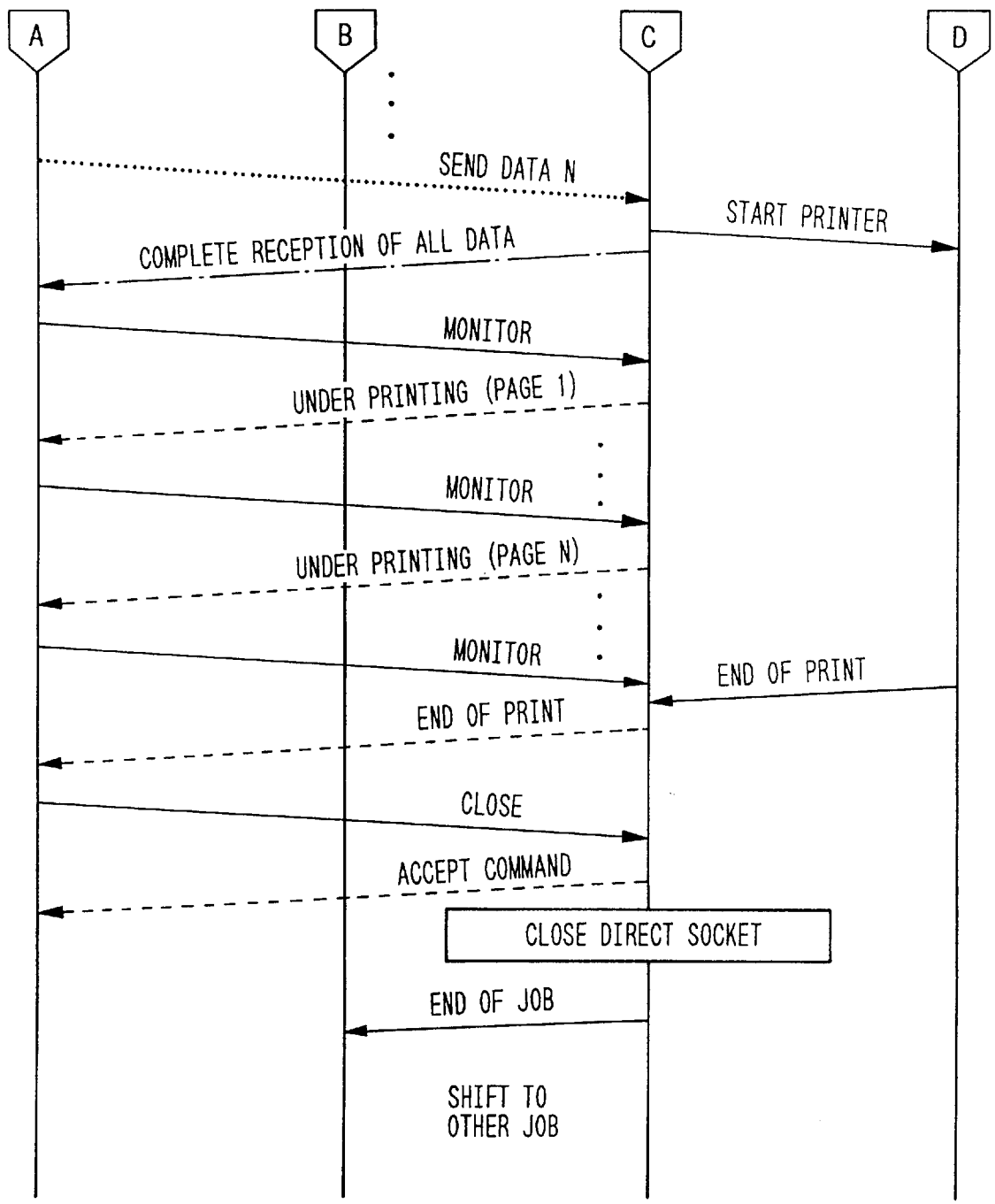

On the other hand, in case of the direct connection print as shown in FIGS. 18A and 18B, after the command acceptance was received, the data transmitting process is directly executed to the S/P server (200), thereby allowing the image data to be printed by the digital color copier (1000). After completion of the data transfer, a close command is issued, thereby closing a socket for a direct connection and finishing the job. In the case where the close command is accepted and the printing operation of the digital color copier (1000) is perfectly finished, the S/P server (200) side closes the socket for a direct connection and issues a job end message to the file server (500).

In the ordinary scan in the file server type mode in the scanner/printer server system shown in FIG. 1, after the command was registered in the file server (500) and the command acceptance was received, the data is transmitted and received to/from the file server (500). After the data or the like scanned by the digital color copier (1000) was spooled to the file server (500), it is transferred to the client computer (host) (400).

Figure 19B:
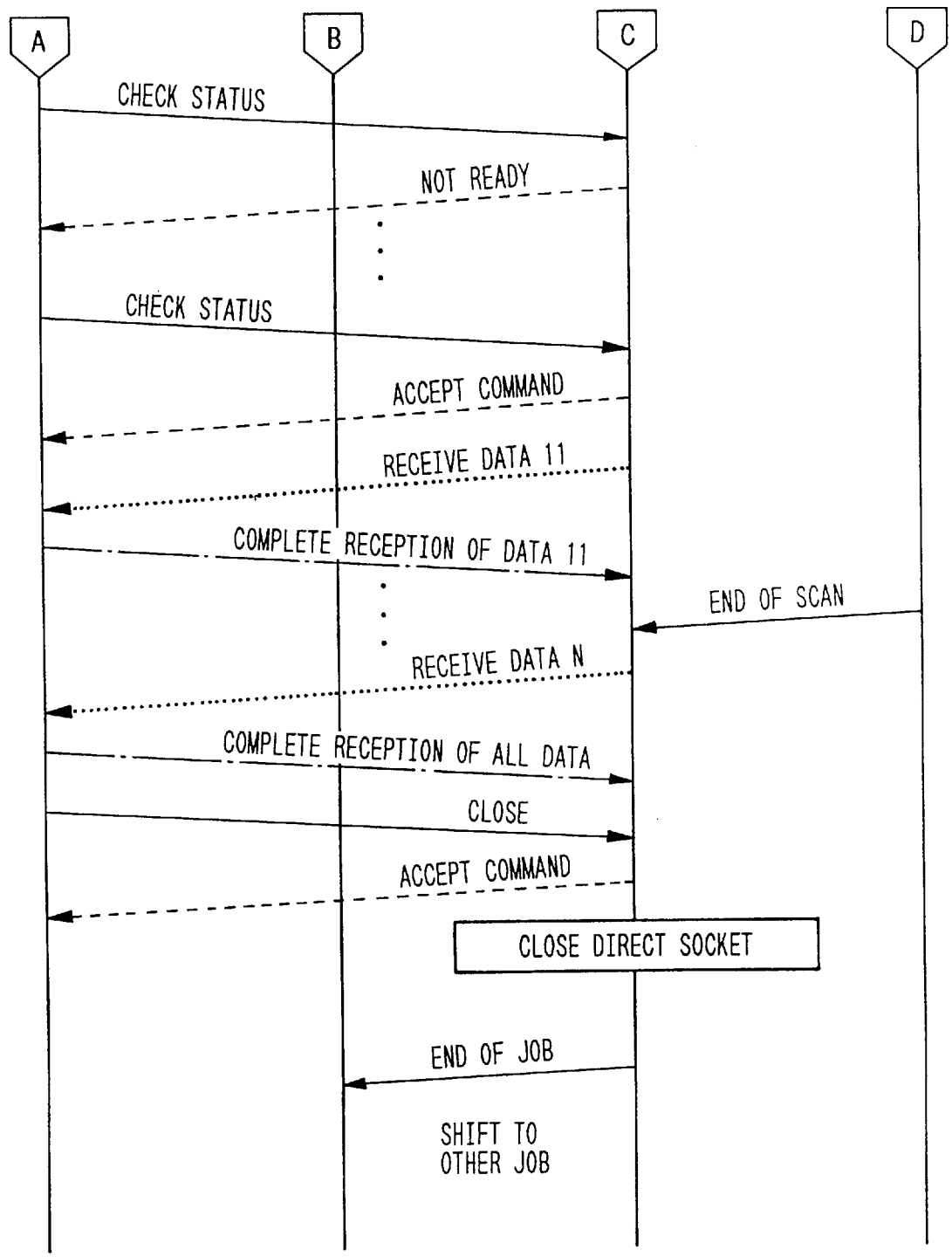

On the other hand, in case of the direct connection scan as shown in FIGS. 19A and 19B, after the command acceptance was received, the data receiving process is directly performed to the S/P server (200), thereby allowing the data to be scanned by the digital color copier (1000).

After completion of the data transfer, the close command is issued, thereby closing the socket for a direct connection and finishing the job. In the case where the close command is accepted and the printing operation of the digital color copier (1000) is perfectly finished, the S/P server (200) side closes the socket for a direct connection and issues a job end message to the file server (500).

The direct connection scan in which a real-time performance such as a scanner input is required will now be mentioned as an example with respect to the scanner on the network and a specific operating procedure will now be described with reference to FIGS. 13 to 16.

Figure 13:
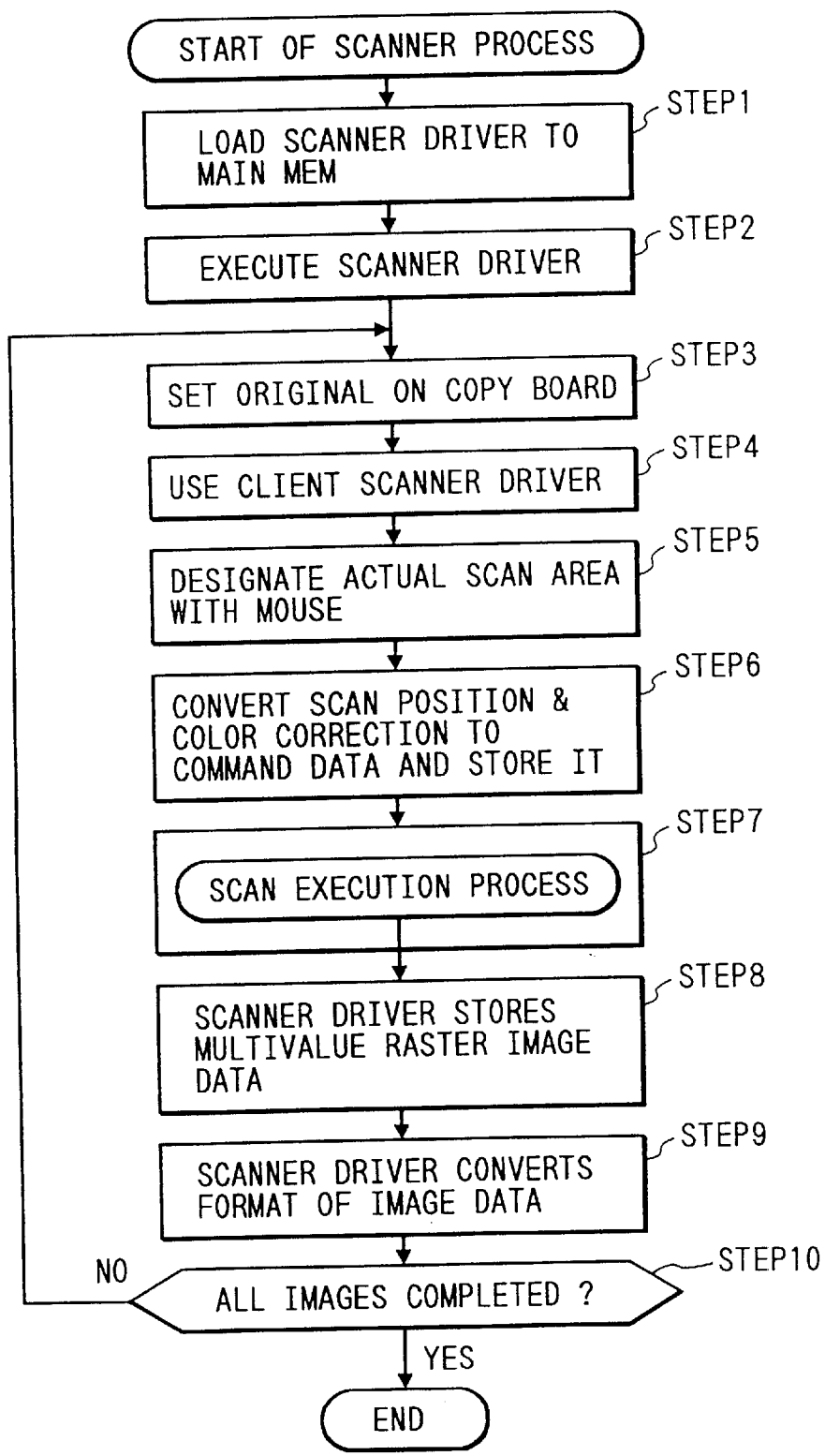
FIG. 13 is a flowchart for a server system of the embodiment.

<Scan executing process on client computer> (FIG. 13)

On the client computer (400), a software for scan input (hereinafter, referred to as a scanner driver) is loaded from the hard disk (451) onto the main memory (460) <STEP1> and is executed by the CPU (405) <STEP2>. The user sets an original to be read onto the copyboard of the digital color copier <STEP3>. The user can designate a scanner area, a color balance setting, an image type, and an original size on the color display (412) by using the mouse (431) and keyboard (441) <STEPs 5, 6>.

Figure 14:
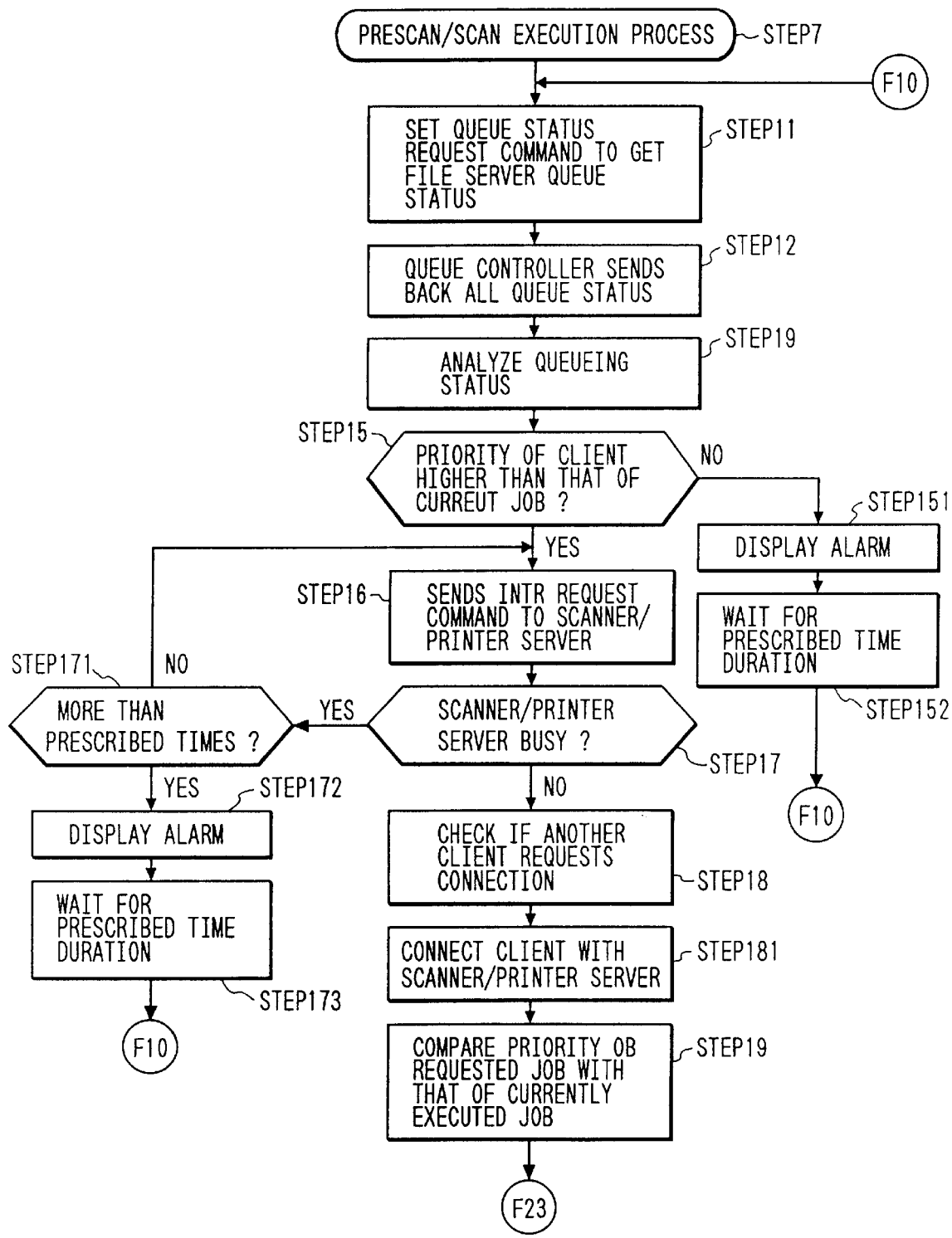
FIG. 14 is a flowchart for a server system of the embodiment.

<Status request for file server queue> (FIG. 14)

The scanner driver communicates with the network controller (520) of the file server (500) for the network controller (420). On the basis of a network address (453) of the file server which has previously been registered in the client computer, the network controller (420) sets a receiver destination address of the packet base (10001) and sets an ID for a color scanner/printer that has unconditionally been decided as an ID to identify a function into a function ID of the header section, thereby indicating that an execution status relates to the color scanner and the printer. Since an ID of the job is not yet specified, 0 is set and an ID of a command that indicates a data block of the command and has unconditionally been determined is set as a type ID of the job. A command of a queue status request is set into the data block section in this instance in order to get queue status information on the file server side <STEP12>.

The client computer (400) transfers the packet data to the file server (500) through the network controller (420). On the file server side, the file server main controller (510) separates the contents of the packet into the header section and the data block section, determines that the contents of the data block section indicate a command, and executes a process according to the command. Since the request from the client side is a command of the queue status request of the file server, the file server main controller (510) requests the queue management controller to discriminate the presence or absence of queue information of the scanner/printer corresponding to the designated function ID (10021). The queue management controller sends back statuses of all of the queues corresponding to the designated devices <STEP12>.

<Refer to queueing table> (FIG. 14)

The queueing table data has a construction such that in order to make it possible to cope with a plurality of scanner/printer servers, a queueing table for each scanner/printer server is managed in a queueing entry table and a plurality of jobs to print/scan requested from the clients have been registered in each of the queueing tables. The queue management controller refers to the contents of the queueing tables registered in the queueing entry table and checks the queue type in each queueing table and searches the queue type corresponding to the designated function ID (10021). When the target queue type exists, the whole status information is formed from the queueing table data. If there are a plurality of targets, the whole status information of a plurality of targets is formed.

Figure 8:
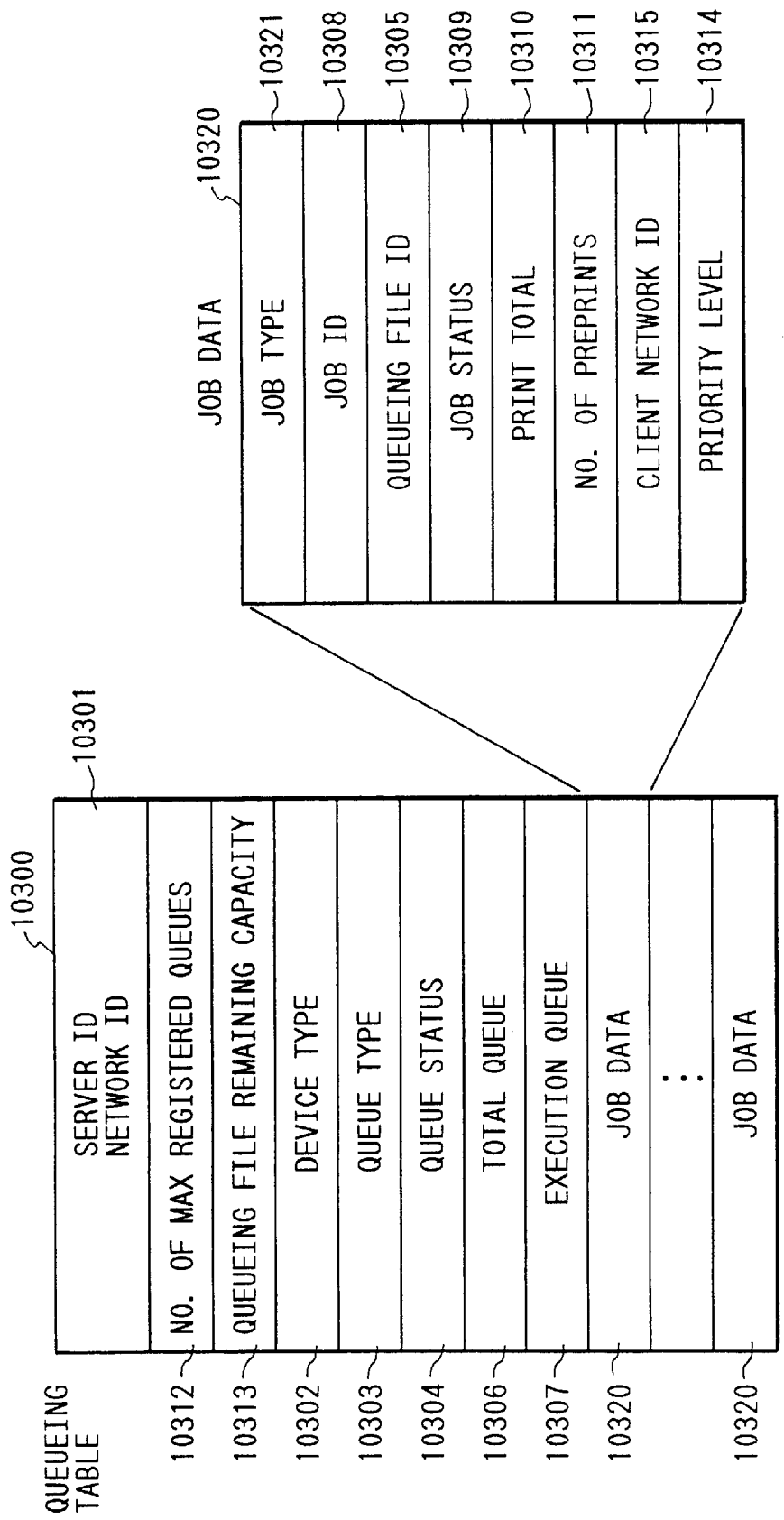
FIG. 8 is a diagram of a queueing table of the embodiment.

As shown in FIGS. 8 and 7, the data of the whole status information is a queue corresponding to the designated function ID (10021) and is constructed by: a registered queue ID (10209); a server ID/network ID (10301) of the printer server as a target of the queue; a queueing file remaining capacity (10313) in which queueing file data can be registered and which was allocated to the queue table; the total number of queues registered at present (namely, total queue) (10306); the maximum number of registered queues (10312); a priority level (10314) of the client for every registered queue; a client network ID (10315) of the client who registered the job; and an error code.

The data of the whole status information is set into the data block section of the packet data. The job type ID in the header is returned as an ID of the status block to the client computer which issued the status request. In the case where the target queue information doesn't exist, an error code which indicates that the target scanner/printer cannot be found out and which has unconditionally been decided is set into the data block section of the packet data and is returned to the client computer which issued the status request.

<Check of queueing table> (FIG. 14)

In a manner similar to the foregoing file server, the client computer divides and analyzes the contents of the packet data returned from the file server and obtains a registered queue ID corresponding to the scanner/printer server that is at present effective <STEP13>. In this instance, from the data of the whole status information, a value of the priority level (10314) of an execution queue (10307) which is at present being progressed is compared with a value of the priority level which has been preset on the client computer <STEP15>. The priority level denotes the value to decide whether the queue registration is performed to the file server or to decide an exchange of the executing order when the scan/print is executed. Priorities of 1 to 10 are allocated to the client computers and are registered as a client priority table (562/262) on the file server side and the scanner/printer server side.

When the priority level on the client side is lower than the queue which is at present being executed, the scanner driver on the client side displays to the user a message of an alarm indicating that the job cannot be directly registered and executed into the scanner/printer server <STEP151>. The foregoing operations are repeated after the elapse of a prescribed time duration. The apparatus waits until the priority of the job that is being executed on the file server is lower than the own priority <STEP152>.

<Direct access to scanner/printer server>

An important process of the embodiment, namely, a process in the case where the whole status information on the file server (500) side mentioned above is obtained before it is directly registered and executed into the scanner/printer server, so that the priority level on the client side is higher than that of the queue which is at present being executed will now be described.

<Scanner interruption to scanner/printer server> (FIG. 14)

The client computer (400) interrupts the network ID (10I/10301) of the target scanner/printer server from the queueing table (10300) from the whole status information of the packet data returned from the file server (500). The client computer sets an interruption request command into the data block section of a packet base for the scanner/printer server (200) and transfers in accordance with the foregoing procedure.

As a parameter of the interruption request command, as mentioned above, a value of a job priority level (452) which has previously been registered on the hard disk of the client computer is set <STEP16>. The client computer sends the interruption request command to the scanner/printer server every predetermined time interval. When a connection answer is not returned even after the transmission of the interruption request command was repeated a predetermined number of times <STEP17>, the scanner driver displays to the user an alarm message indicating that the job cannot be performed <STEP 172>. The operation to issue a whole status request command to the file server side as mentioned above after the elapse of a prescribed time duration is repeated <STEP171>. The apparatus waits until a vacancy is caused on the file server.

During such a period of time, the scanner/printer server receives the image data of the job which is at present being executed from the file server and executes a procedure for sequentially registering the image data into the raster image data section. However, the network server controller (221)

checks whether a scanner request is not directly sent from another client to the scanner/printer server at every predetermined time interval <STEP18>.

Figure 15:
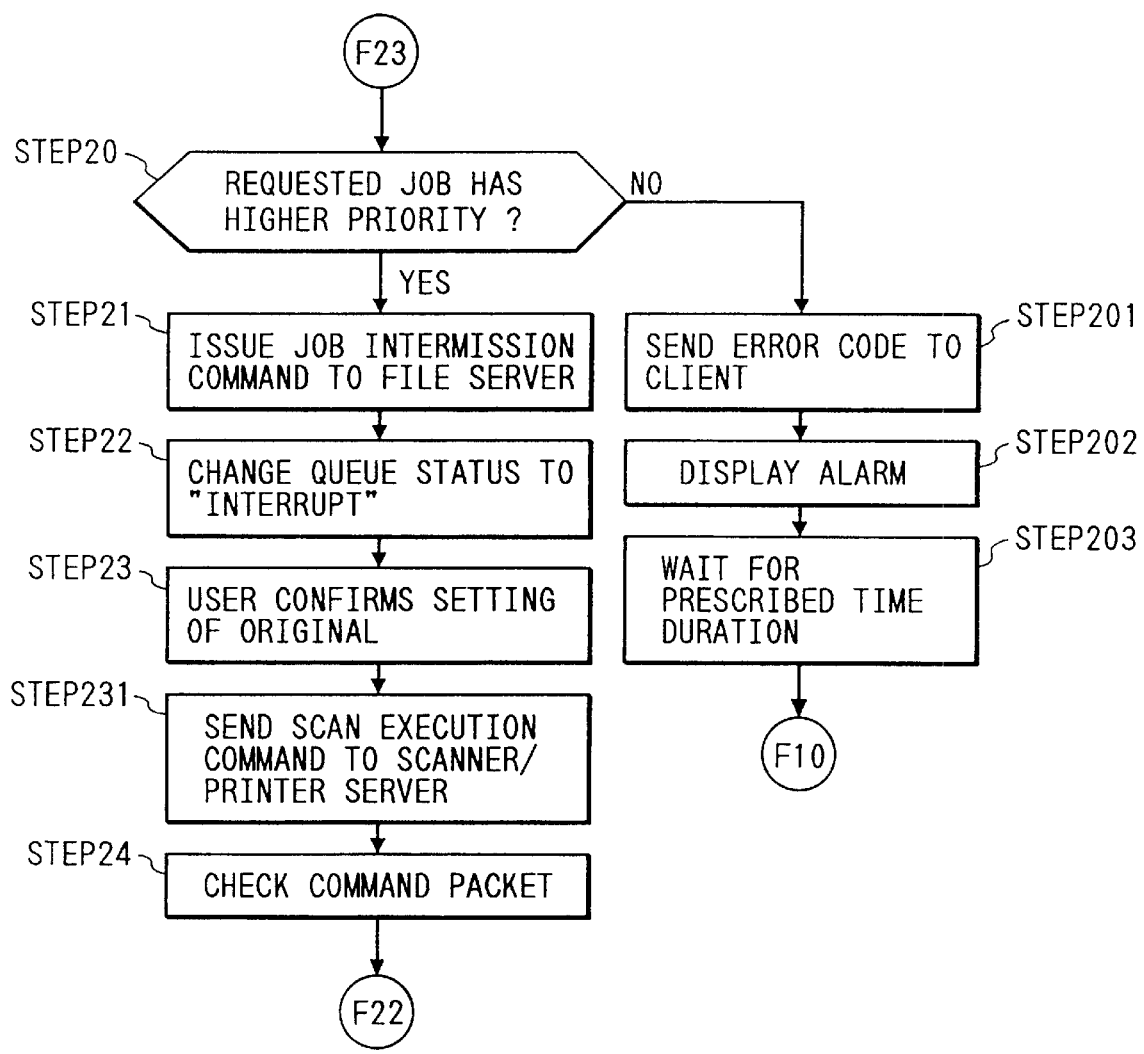
FIG. 15 is a flowchart for a server system of the embodiment.

<Check of interruption level of client> (FIGS. 14, 15)

The scanner/printer server (200) which received the packet of the interruption request command from the client side <STEP181> first compares the priority level at which the interruption was requested and the priority of the client job which is at present being executed from a client priority level table (262) <STEP19>. When the priority of the job which is at present being executed is higher <STEP20>, an error code indicative of such a fact is set into the packet base and is returned as status information to the client side <STEP201>.

Since the status information from the scanner/printer server (200) is an error, the scanner driver on the client side notifies a message indicating that the direct connection to the scanner/printer server could not be performed to the user <STEP202>. After the user confirmed such a message, the file server is again accessed after the elapse of a predetermined time set on the host and a similar procedure is repeated <STEP203>. When the priority of the job of the interruption request is higher, the job ID for interruption which has unconditionally been determined is set into the status packet and is returned to the client side as mentioned above.

<Generation of job interruption command> (FIG. 15)

To interrupt the job which is at present being executed, the scanner/printer server (200) issues a job interruption command to the file server (500). As a parameter of the job interruption command, the job ID of the job as a target which has been being executed on the scanner/printer server is set <STEP21>.

<Reset of job> (FIG. 15)

The file server (500) detects a queue table as a target from the job ID derived from the command packet and changes the queue status to a value having a meaning which has unconditionally been determined and during the execution of the interruption <STEP22>. Thus, another client side which has been executing the job can know that the execution job was interrupted from a queue status (10304) by a monitoring method.

<Direct scanner registration/image data transfer to scanner/printer server> (FIG. 15)

The scanner driver of the client computer (400) checks whether the interruption has been admitted or not from the packet of the status returned from the scanner/printer server (200). When the interruption is made, a message is issued to the user so as to confirm whether the original to be read to the scanner of the digital color copier serving as a target has been put on the copyboard or not. Thus, after confirming the original, the user issues an instruction for confirming a paper size of the original, a type of image data (RGB, gray scale, 2-value bit map) when interrupting, a reading resolution, a color balance <STEP23>.

The scanner driver sets the same value as the interruption job ID which has been set in the status packet that had already been derived from the scanner/printer server into the job (10023) of the packet base (10001) and sets the command type as a job type ID (10022). In this instance, the data block section (10100) sets a scanner execution command <STEP23>. Original size information (width, height) parameters to be scanned which have already been instructed from the user for the scanner driver and parameters of the image size (width, height) of the image data calculated on the basis of the color balance information, resolution information, and original size and the type (RGB, gray scale, 2-value bit map) of the image data are set into the command section (10005) by the data block section (10100). The packet of the scanner execution command is transferred to the scanner/printer server (200) side by the network controller in a manner similar to the foregoing packet transfer <STEP231>.

Figure 16:
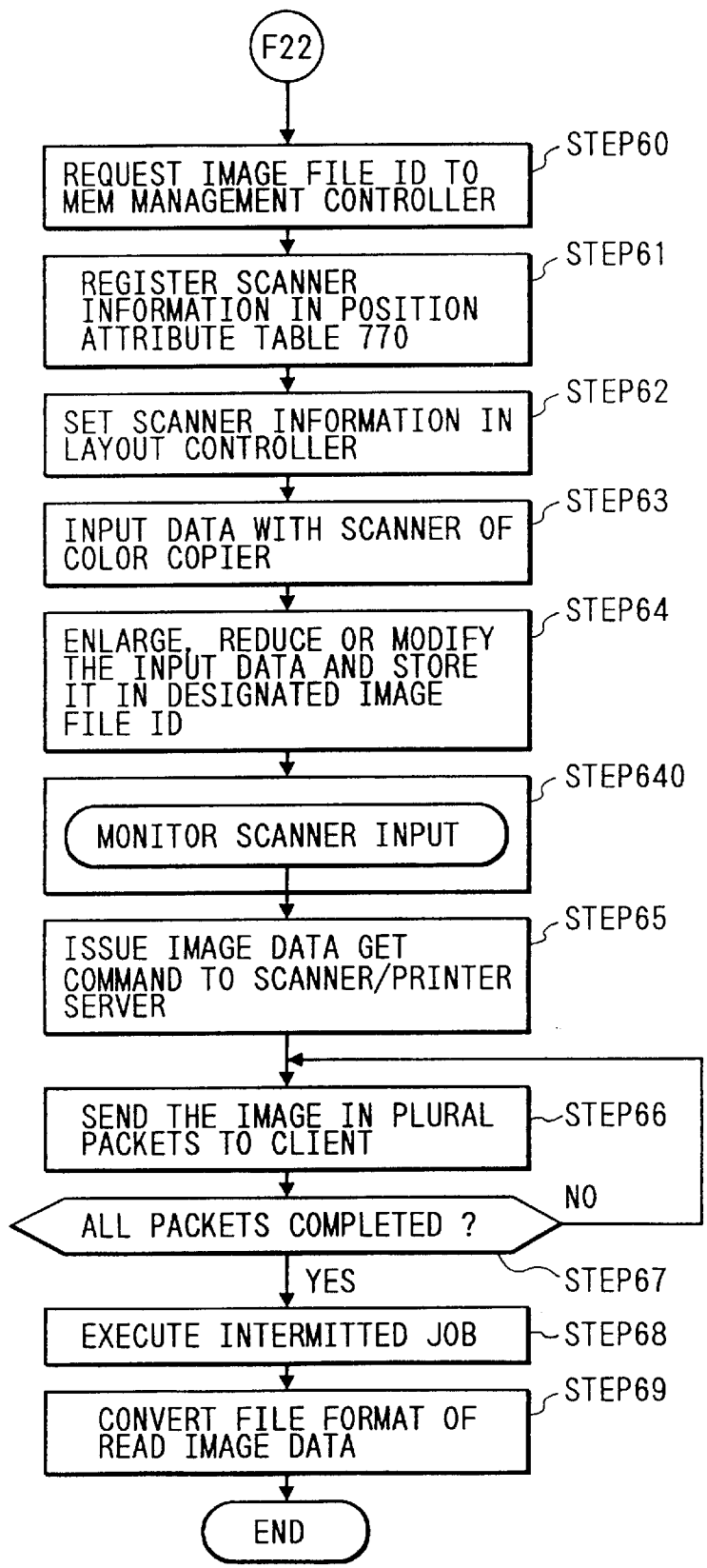
FIG. 16 is a flowchart for a server system of the embodiment.

<Scanner input to scanner/printer server> (FIG. 16)

The scanner/printer server (200) receives the scanner input command packet (10005) from the client computer (400). The main controller (210) sets up the raster image controller (710) so as to operate in the file management mode mentioned above. Thus, the image controller sets up the image file ID into an arbitrary ID when registering for the memory management controller in order to register the scanned image into the raster image memory (760). The memory management controller uses the ID for management and identification <STEP60>.

The main controller of the scanner/printer server sets the parameters regarding the original size information, color balance, image size, type of image data which were derived by the foregoing scanner input command into a layout controller. A trigger of the scanner input is performed to the color scanner of the color digital copier through the color digital I/F controller (790). Thus, the original set by the user is obtained as RGB image data. In this instance, the conversion based on the parameters designated by the user is executed by the layout controller in a real-time manner. The image data is transferred to the raster image memory (760) and is registered into the position/attribute table (770) corresponding to the image file ID which has been determined before and is managed <STEP61>.

Figure 17:
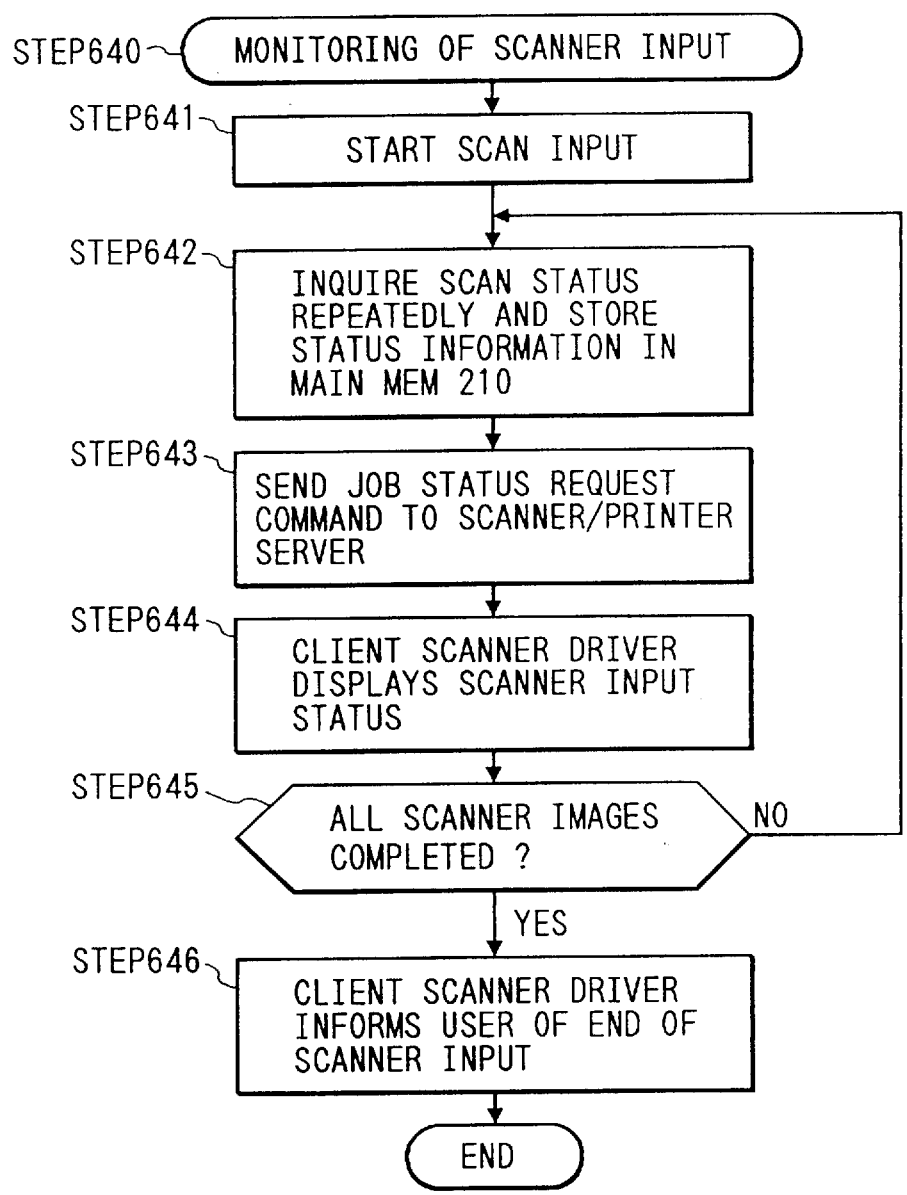
FIG. 17 is a flowchart for a server system of the embodiment.

<Setting of status information such as inexecution/completion or the like of scanner input> (FIG. 17)

The status of the interruption which is being executed by the scanner/printer server can be monitored from the client any time <STEP640>. At a time point when the scan is started, the main controller (210) inquires the situation of the scan to the raster image storage (700) at every predetermined interval, thereby confirming an error situation regarding the scan and holding the information about the confirmation into a main memory (560) <STEP642>. A ratio of the area which has already been inputted at present is registered into the main memory as monitor information. As area information of the scanner input designated from the client, the x and y coordinates at the left upper position of an input range, the number of pixels of a region defined by the width and height of the size, and the image type (RGB, gray scale, 2-value bit map) of the inputting process are also registered into the main memory. In the case where an input error occurs, its error code is registered into the main memory. An end flag indicating that the scanner input has normally been finished is also registered into the main memory.

<Monitoring of status information of client>

The client computer (400) generates a scan execution packet. After all of the command packets were issued, the interrupting processing situation on the scanner/printer server side is monitored. The scanner driver of the client computer (400) generates a command packet of a job status request command through the network controller (420) <STEP643>. The command packet sets the job ID which indicates the interrupting process of the scanner input and which was designated from the scanner/printer server as a parameter and generates the job ID to the scanner/printer server in accordance with the foregoing procedure.

When the scanner/printer server receives the job status request command, the monitor information which has already been registered into the main memory is returned to the client side as a status packet. The scanner driver of the client computer (400) uses the returned monitor information as status information derived from the scanner/printer server and displays an executing process indicating to which degree the scanner input has progressed at present to the display through the display controller. A judgment in the case where an error occurs is also performed by the monitor information <STEP644>.

The scanner driver obtains the monitor information from the scanner/printer server side at every predetermined interval by the packet of the job status request command. From the end flag of the monitor information, the client side can know whether the scanner input has been completed or not <STEP645>. The scanner driver displays the end of the scanner input by the display, thereby informing the user of such a fact. A procedure such that the apparatus enters a mode to transfer the input image data to the client side from now on is displayed <STEP646>.

<Image transfer of scanner/printer server> (FIG. 16)

The scanner driver of the client computer (400) judges the end of the scanner inputting process on the basis of the monitor information and issues an image data GET command transfer to the scanner/printer server in accordance with the foregoing procedure <STEP65>. To transfer the image data read by the scanner to the client by the command, the scanner/printer server (200) sets the total number of packets of the image data block corresponding to the image data size into the total packet ID (10031) of the header (10020). The scanner/printer server (200) sequentially adds serial packet IDs to the image data blocks and transfers the resultant blocks as a series of image data packets. The image data packets are sequentially transferred to the client side from the raster image memory (760) which manages the images read by the scanner in a manner similar to the packet transfer mentioned above <STEP66>.

<Restart of interruption job> (FIG. 16)

Since all of the interruption inputting processes are completed as mentioned above, the scanner/printer server executes a process to again execute the interrupted job for the file server <STEP68>.

<Getting of image of scanner driver>

The scanner input image data sent from the scanner/printer server is transferred to the scanner driver through the network controller of the host computer and a process to extract the image data from the image data packet is executed. The image data is once stored into the hard disk (451) on the host computer. On the basis of an instruction from the user, the scanner driver again converts the image data into the designated image file format and registers onto the hard disk <STEP69>.

As mentioned above, the direct interruption access to the scanner server can be performed without using the spool function on the file server. The image input situation can be directly monitored between the scanner/printer server and the client without passing through the file server. The function to read an image in which real-time performance is required can be efficiently monitored.

What is claimed is:

1. An apparatus in a system in which a data source, a server, and said apparatus are connected on a network, comprising:

receiving means for receiving a direct command from the data source for requesting a direct communication between the data source and said apparatus;

judging means for judging whether the direct command can be accepted when the direct command is received during a data communication with the server; and control means for interrupting the data communication with the server in the case where said judging means judges that the direct command can be accepted.

2. An apparatus according to claim 1, wherein the direct command is a request for transmitting print job data to said apparatus without passing through the server.

3. An apparatus according to claim 1, wherein the direct command is a request for transmitting scan job data to said apparatus without passing through the server.

4. An apparatus according to claim 1, wherein a copier is connected to said apparatus.

5. An apparatus according to claim 1, wherein a printer is connected to said apparatus, and wherein said apparatus directly receives, without passing through the server, data from the data source to be printed by the printer.

6. An apparatus according to claim 1, wherein a scanner is connected to said apparatus, and wherein said apparatus directly transmits, without passing through the server, data scanned by the scanner to the data source.

7. An apparatus according to claim 1, wherein a scanner is connected to said apparatus, and wherein said apparatus directly transmits, without passing through the server, monitor information indicative of a scanning state in the scanner to the data source in order to display the monitor information onto a display of the data source.

8. A memory medium in which a program that is used in an apparatus in a system in which a data source, a server, and the apparatus are connected on a network has been stored, comprising the steps of:

receiving a direct command from the data source for requesting a direct communication between the data source and the apparatus;

judging whether the direct command can be accepted when the direct command is received during a data communication with the server; and storing a program to interrupt the data communication with the server in the case where it is judged in said judging step that the direct command can be accepted.

9. A medium according to claim 8, wherein the direct command is a request for transmitting print job data to the apparatus without passing through the server.

10. A medium according to claim 8, wherein the direct command is a request for transmitting scan job data to the apparatus without passing through the server.

11. A medium according to claim 8, wherein a copier is connected to the apparatus.

12. A medium according to claim 8, wherein a printer is connected to the apparatus, and wherein the apparatus directly receives, without passing through the server, data from the data source to be printed by the printer.

13. A medium according to claim 8, wherein a scanner is connected to the apparatus, and wherein the apparatus directly transmits, without passing through the server, data scanned by the scanner to the data source.

14. A medium according to claim 8, wherein a scanner is connected to said apparatus, and wherein the apparatus directly transmits, without passing through the server, monitor information indicative of a scanning state in the scanner to the data source in order to display the monitor information onto a display of the data source.

15. A data source in a network system in which said data source, a server, and a destination apparatus are connected, said data source comprising:

first transmission means for transmitting data to the destination apparatus through the server;

second transmission means for performing a direct data transmission to the destination apparatus without passing through the server; and third transmission means for transmitting predetermined data to the server, prior to the direct data transmission performed by said second transmission means.

16. A data source according to claims 15, wherein the predetermined data comprises data for requesting the server to send back status data indicative of a status of the server.

17. A data source according to claim 16, further comprising determining means, responsive to the status data sent back in response to the predetermined data transmitted by said third transmission means, for determining whether the direct data transmission is to be performed by said second transmission means.

18. A data source according to claim 16, wherein the status data comprises queue status data spooled in the server.

19. A data source according to claim 16, wherein said data source requests the destination apparatus to perform the direct data transmission with said data source after transmitting the predetermined data to the server.

20. A method used in a data source in a network system in which the data source, a server, and a destination apparatus are connected, said method comprising the steps of:

transmitting data to the destination apparatus through the server;

performing direct data transmission to the destination apparatus without passing through the server; and transmitting predetermined data to the server, prior to the direct data transmission performed in said step of performing direct data transmission.

21. A method according to claim 20, wherein the predetermined data transmitted in said transmitting step includes data for requesting the server to send back status data indicative of a status of the server.

22. A method according to claim 21, further comprising the step of:

determining, in response to the status data sent back in response to the predetermined data transmitted in said transmitting step, whether said step of performing direct data transmission is to be performed.

23. A method according to claim 21, wherein the status data includes queue status data spooled in the server.

24. A method according to claim 21, wherein the data source requests the destination apparatus to perform said step of performing direct data transmission with the data source after transmitting the predetermined data to the server in said transmission step.

* * * * *

UNITED STATES PATENT AND TRADEMARK OFFICE
CERTIFICATE OF CORRECTION

PATENT NO.   : 5,845,076                                              Page 1 of 1
DATED        : December 1, 1998
INVENTOR(S)  : Naoto Arakawa It is certified that error appears in the above-identified patent and that said Letters Patent is hereby corrected as shown below:

Title page, Item [54], and Column 1, line 1,
"COUPED" should read -- COUPLED --.

Title page,
Item [56], References Cited, FOREIGN PATENT DOCUMENTS, "4123006" should read -- 4-123006 --; and "5241012" should read -- 5-241012 --.

Drawings,
Sheet 14, FIG. 14, Step 15, "CURREUT" should read -- CURRENT --.

Column 1,
Line 20, "users-" should read -- users --.

Column 8,
Line 30, "the" should read -- its --.

Column 11,
Line 40, "Getting of" should read -- Getting --.

Signed and Sealed this

Second Day of July, 2002

Attest:

Attesting Officer

JAMES E. ROGAN
Director of the United States Patent and Trademark Office